US011388695B2

(12) United States Patent
Islam et al.

(10) Patent No.: US 11,388,695 B2
(45) Date of Patent: Jul. 12, 2022

(54) MULTIPURPOSE DOWNLINK CONTROL INFORMATION BIT FIELDS

(71) Applicant: QUALCOMM Incorporated, San Diego, CA (US)

(72) Inventors: Muhammad Nazmul Islam, Littleton, MA (US); Tao Luo, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/118,881

(22) Filed: Dec. 11, 2020

(65) Prior Publication Data

US 2021/0099973 A1 Apr. 1, 2021

Related U.S. Application Data

(63) Continuation of application No. 16/164,370, filed on Oct. 18, 2018, now Pat. No. 10,893,506.

(Continued)

(51) Int. Cl.
*H04W 68/02* (2009.01)
*H04L 1/18* (2006.01)
(Continued)

(52) U.S. Cl.
CPC ........... *H04W 68/02* (2013.01); *H04L 1/1812* (2013.01); *H04L 5/0048* (2013.01);
(Continued)

(58) Field of Classification Search
CPC ... H04W 68/02; H04W 52/54; H04W 72/042; H04W 48/12; H04W 52/58;
(Continued)

(56) References Cited

U.S. PATENT DOCUMENTS

2013/0223376 A1 8/2013 Seong et al.
2015/0016312 A1 1/2015 Li et al.
(Continued)

OTHER PUBLICATIONS

Taiwan Search Report—TW108100501—TIPO—dated Apr. 1, 2021.
(Continued)

*Primary Examiner* — Walter J Divito
*Assistant Examiner* — Anthony Luo
(74) *Attorney, Agent, or Firm* — Holland & Hart LLP

(57) ABSTRACT

Methods, systems, and devices for wireless communications are described. In some wireless communications systems, a base station may transmit downlink control information (DCI) messages to a user equipment (UE). A DCI message may be transmitted using a particular DCI format based on the type of control information included in the DCI message. In some cases, different types of control information may be transmitted using the same DCI format. In such cases, one or more bit fields in a DCI format may be useful to a UE for one type of control information but may not be useful to a UE for another type of control information. As described herein, in order to limit the overhead associated with control information transmissions, a base station may support techniques for utilizing these bit fields in a DCI format to transmit information corresponding to the type of control information being transmitted.

28 Claims, 17 Drawing Sheets

Related U.S. Application Data

(60) Provisional application No. 62/625,288, filed on Feb. 1, 2018.

(51) Int. Cl.
| | |
|---|---|
| *H04L 5/00* | (2006.01) |
| *H04W 52/54* | (2009.01) |
| *H04W 72/04* | (2009.01) |
| *H04W 48/12* | (2009.01) |
| *H04W 52/58* | (2009.01) |

(52) U.S. Cl.
CPC .......... *H04L 5/0053* (2013.01); *H04L 5/0094* (2013.01); *H04W 52/54* (2013.01); *H04W 72/042* (2013.01); *H04W 48/12* (2013.01); *H04W 52/58* (2013.01)

(58) Field of Classification Search
CPC ... H04L 1/1812; H04L 5/0048; H04L 5/0053; H04L 5/0094
See application file for complete search history.

(56) References Cited

U.S. PATENT DOCUMENTS

| | | | |
|---|---|---|---|
| 2015/0271006 A1* | 9/2015 | Han | H04L 1/0061 370/329 |
| 2016/0345311 A1* | 11/2016 | Chen | H04L 5/0053 |
| 2016/0353415 A1 | 12/2016 | Sarkar et al. | |
| 2018/0007667 A1 | 1/2018 | You et al. | |
| 2018/0013533 A1 | 1/2018 | Yang et al. | |
| 2018/0235013 A1 | 8/2018 | Jung et al. | |
| 2019/0215048 A1 | 7/2019 | Cirik et al. | |
| 2019/0223160 A1 | 7/2019 | He et al. | |
| 2019/0239187 A1 | 8/2019 | Islam et al. | |

OTHER PUBLICATIONS

"3rd Generation Partnership Project; Technical Specification Group Radio Access Network; NR; Multiplexing and Channel Coding (Release 15)," 3GPP Standard; Technical Specification; 3GPP TS 38.212, 3rd Generation Partnership Project (3GPP), Mobile Competence Centre; 650, Route Des Lucioles; F-06921 Sophia-Antipolis Cedex; France, vol. RAN WG1, No. V15.0.0, Jan. 3, 2018, pp. 1-82, XP051392262, [retrieved on Jan. 3, 2018] section 7.3.1.2.1.

ETSI/3GPP, "LTE; Evolved Universal Terrestrial Radio Access (E-UTRA); Multiplexing and Ct1annel Coding, (3GPP TS 36.212 version 14.2.0 Release 14)," Technical Specification, Apr. 2017, ETSI TS 136 212 V14.2.0, European Telecomunnications Standards Institute (ETSI), 650 Route Des Lucioles, F-06921, Sophia-Antipolis Cedex, France, 206 Pages.

Huawei, et al: "Text Proposal for Paging," 3GPP Draft; R1-1801261,3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 29, 2018, XP051385480, 2 pages, Retrieved from the Internet: URL: http://www.3gpp.org/ftp/tsg%5Fran/WG1%5FRL1/TSGR1%5FAH/NR%5FAH%5F1801/Docs/[retrieved on Jan. 29, 2018].

International Search Report and Written Opinion—PCT/US2019/012687—ISA/EPO—dated May 22, 2019.

NTT Docomo, et al., "Offline Discussion for Search Space," 3GPP Draft; R1-1801129, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 25, 2018, XP051385333, 4 pages, Retrieved from the Internet: URL: http://www.3gpp.org/ftp/tsg%5Fran/WG1%5FRL1/TSGR1%5FAH/NR%5FAH%5F1801/Docs/[retrieved on Jan. 25, 2018].

Partial International Search Report—PCT/US2019/012687—ISA/EPO—dated Mar. 29, 2019.

* cited by examiner

| Bits | Field |
|---|---|
| 1 | Identifier for DCI formats |
| 2 | Bandwidth part indicator |
| Variable | Frequency Domain Resource Assignment |
| X | Time domain resource assignment |
| 1 | VRB-to-PRB mapping |
| 5 | Modulation and coding scheme |
| 1 | New Data Indicator |
| 2 | Redundancy version |
| 4 | HARQ process number |
| 2 | Downlink assignment index |
| 2 | TPC command for scheduled PUCCH |
| 2 | PUCCH resource indicator |
| 3 | PDSCH-to-HARQ_feedback timing indicator |

215 ▨ Multipurpose Bit Fields

220 ☐ Other Bit Fields 210-a

FIG. 3

| Bits | Indication |
|---|---|
| 1 | Short Message Indicator |
| 2 | Bandwidth part indicator |
| Variable | Frequency Domain Resource Assignment |
| X | Time domain resource assignment |
| 1 | VRB-to-PRB mapping |
| 5 | Modulation and coding scheme |
| 1 | New Data Indicator |
| 2 | Redundancy version |
| 4 | HARQ process number |
| 2 | Downlink assignment index |
| 2 | Other Paging Indicator |
| 2 | Other Paging Indicator |
| 3 | Other Paging Indicator |

215 ▨ Multipurpose Bit Fields

220 ☐ Other Bit Fields

| Bits | Indication |
|---|---|
| 1 | System Information Format Indicator |
| 2 | Bandwidth part indicator |
| Variable | Frequency Domain Resource Assignment |
| X | Time domain resource assignment |
| 1 | VRB-to-PRB mapping |
| 5 | Modulation and coding scheme |
| 1 | New Data Indicator |
| 2 | Redundancy version |
| 4 | HARQ process number |
| 2 | Downlink assignment index |
| 2 | Short System Information Indicator |
| 2 | Other System Information Indicator |
| 3 | Other System Information Indicator |

215 ▬ Multipurpose Bit Fields

220 ▭ Other Bit Fields

| Bits | Indication |
|---|---|
| 1 | Transmission Configuration for Msg3 Indicator |
| 2 | Bandwidth part indicator |
| Variable | Frequency Domain Resource Assignment |
| X | Time domain resource assignment |
| 1 | VRB-to-PRB mapping |
| 5 | Modulation and coding scheme |
| 1 | New Data Indicator |
| 2 | Redundancy version |
| 4 | HARQ process number |
| 2 | Downlink assignment index |
| 2 | TPC command for scheduled PUCCH |
| 2 | PUCCH resource indicator |
| 3 | Other Random Access Indicator |

215 ▨ Multipurpose Bit Fields

220 ▢ Other Bit Fields 210-d

MULTIPURPOSE DOWNLINK CONTROL INFORMATION BIT FIELDS

CROSS REFERENCES

The present application for patent is a continuation of U.S. patent application Ser. No. 16/164,370 by Islam et al., entitled "MULTIPURPOSE DOWNLINK CONTROL INFORMATION BIT FIELDS," filed Oct. 18, 2018 which claims the benefit of U.S. Provisional Patent Application No. 62/625,288 by Islam et al., entitled "MULTIPURPOSE DOWNLINK CONTROL INFORMATION BIT FIELDS," filed Feb. 1, 2018, assigned to the assignee hereof, and expressly incorporated herein.

BACKGROUND

The following relates generally to wireless communication and more specifically to multipurpose downlink control information (DCI) bit fields.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support control signaling between a base station and a UE such that these devices may be able to identify appropriate configurations for communicating with each other. As the number of features supported by a wireless communications system increases and the amount of control signaling between a base station and a UE increases, the overhead associated with control signaling in a wireless communications system may also increase, resulting in reduced throughput in the wireless communications system.

SUMMARY

In some wireless communications systems, a base station may transmit downlink control information (DCI) messages to a user equipment (UE), in order to configure the UE for communications with the base station. A DCI message may be transmitted using a particular DCI format based on the type of control information being transmitted. In some cases, different types of control information may be transmitted using the same DCI format. In such cases, one or more bit fields in a DCI format may be used for the transmission of one type of control information, and may not be used (e.g., may be frozen) for another type of control information. As described herein, in order to limit the overhead associated with control information transmissions, a base station may support techniques for using these bit fields in a DCI format to transmit information related to the type of control information being transmitted. When a UE receives a DCI message from a base station, the UE may determine the type of control information included in the DCI message, and the UE may interpret the bit fields in the DCI message based on the type of control information included in the DCI message.

A method for wireless communication is described. The method may include monitoring a control channel for DCI from a base station, identifying a DCI message in the control channel corresponding to a radio network temporary identifier (RNTI), interpreting at least one bit field in the DCI message based at least in part on the type of control information included in the DCI message and the RNTI, and determining an uplink or downlink transmission configuration for communicating with the base station based at least in part on interpreting the at least one bit field in the DCI message.

An apparatus for wireless communication is described. The apparatus may include means for monitoring a control channel for DCI from a base station, means for identifying a DCI message in the control channel corresponding to a RNTI, means for interpreting at least one bit field in the DCI message based at least in part on the type of control information included in the DCI message and the RNTI, and means for determining an uplink or downlink transmission configuration for communicating with the base station based at least in part on interpreting the at least one bit field in the DCI message.

Another apparatus for wireless communication is described. The apparatus may include a processor, memory in electronic communication with the processor, and instructions stored in the memory. The instructions may be operable to cause the processor to monitor a control channel for DCI from a base station, identify a DCI message in the control channel corresponding to a RNTI, interpret at least one bit field in the DCI message based at least in part on the type of control information included in the DCI message and the RNTI, and determine an uplink or downlink transmission configuration for communicating with the base station based at least in part on interpreting the at least one bit field in the DCI message.

A non-transitory computer-readable medium for wireless communication is described. The non-transitory computer-readable medium may include instructions operable to cause a processor to monitor a control channel for DCI from a base station, identify a DCI message in the control channel corresponding to a RNTI, interpret at least one bit field in the DCI message based at least in part on the type of control information included in the DCI message and the RNTI, and determine an uplink or downlink transmission configuration for communicating with the base station based at least in part on interpreting the at least one bit field in the DCI message.

In some examples of the method, apparatus, and non-transitory computer-readable medium described above, the type of control information included in the DCI message is determined based at least in part on the RNTI, wherein the type of control information included in the DCI message includes paging information, and interpreting at least one bit field in the DCI message includes interpreting at least one bit field in the DCI message as a short message indicator. In some examples of the method, apparatus, and non-transitory computer-readable medium described above, the RNTI includes a paging RNTI (P-RNTI).

In some examples of the method, apparatus, and non-transitory computer readable medium described above, the short message indicator indicates whether the DCI message comprises a short paging message. In some examples of the method, apparatus, and non-transitory computer readable medium described above, the DCI message comprises paging scheduling information.

In some examples of the method, apparatus, and non-transitory computer-readable medium described above, the type of control information included in the DCI message is determined based at least in part on the RNTI, wherein the type of control information included in the DCI message includes system information, and interpreting at least one bit field in the DCI message includes interpreting at least one bit field in the DCI message as a system information format indicator or a short system information indicator. In some examples of the method, apparatus, and non-transitory computer-readable medium described above, the RNTI includes a system information RNTI (SI-RNTI).

In some examples of the method, apparatus, and non-transitory computer-readable medium described above, the type of control information included in the DCI message is determined based at least in part on the RNTI, wherein the type of control information included in the DCI message includes random access information, and interpreting at least one bit field in the DCI message includes interpreting at least one bit field in the DCI message as a configuration for a Message 3 (Msg3) transmission. In some examples of the method, apparatus, and non-transitory computer-readable medium described above, the configuration for the Msg3 transmission indicates whether to include a beam index in the Msg3 transmission. In some examples of the method, apparatus, and non-transitory computer-readable medium described above, the beam index corresponds to a synchronization signal block index or a channel state information reference signal (CSI-RS) index. In some examples of the method, apparatus, and non-transitory computer-readable medium described above, the RNTI includes a random access RNTI (RA-RNTI).

Some examples of the method, apparatus, and non-transitory computer-readable medium described above may further include processes, features, means, or instructions for identifying a first DCI message in the control channel corresponding to a first RNTI, where the first RNTI comprises a P-RNTI, interpreting at least one bit field in the first DCI message as a first indication, identifying a second DCI message in the control channel corresponding to a cell RNTI (C-RNTI), and interpreting at least one bit field in the second DCI message as a second indication. In some examples of the method, apparatus, and non-transitory computer-readable medium described above, the second indication comprises a DCI format identifier, a transmit power control (TPC) command for scheduled physical uplink control channel (PUCCH), a PUCCH resource indicator, a physical downlink shared channel (PDSCH)-to-hybrid automatic repeat request (HARQ) feedback timing indicator, a new data indicator, a redundancy version indicator, or a HARQ process number.

Some examples of the method, apparatus, and non-transitory computer-readable medium described above may further include processes, features, means, or instructions for determining a first type of control information included in the first DCI message based at least in part on the P-RNTI, wherein the first type of control information included in the first DCI message comprises a short paging message or downlink paging scheduling information, and determining a second type of control information included in the second DCI message based at least in part on the C-RNTI, wherein the second type of control information included in the second DCI message comprises a configuration for at least one of an uplink or downlink transmission.

In some examples of the method, apparatus, and non-transitory computer-readable medium described above, the type of control information included in the DCI message includes a grant, and interpreting at least one bit field in the DCI message includes interpreting at least one bit field in the DCI message as a DCI format identifier, a transmit power control (TPC) command for scheduled physical uplink control channel (PUCCH), a PUCCH resource indicator, a physical downlink shared channel (PDSCH)-to-hybrid automatic repeat request (HARQ) feedback timing indicator, a new data indicator, a redundancy version indicator, or a HARQ process number. In some examples of the method, apparatus, and non-transitory computer-readable medium described above, the RNTI includes a cell RNTI (C-RNTI).

In some examples of the method, apparatus, and non-transitory computer-readable medium described above, determining the type of control information included in the DCI message further includes identifying resources used to transmit the DCI message. Some examples of the method, apparatus, and non-transitory computer-readable medium described above may further include processes, features, means, or instructions for determining the type of control information included in the DCI message based at least in part on the resources used to transmit the DCI message.

In some examples of the method, apparatus, and non-transitory computer-readable medium described above, the at least one bit field in the DCI message provides a different indication from a respective bit field in another DCI message including another type of control information. In some examples of the method, apparatus, and non-transitory computer-readable medium described above, interpreting the at least one bit field in the DCI message includes interpreting the at least one bit field in the DCI message as a first indication when the RNTI includes a first RNTI, and interpreting the at least one bit field in the DCI message as a second indication when the RNTI includes a second RNTI that may be different from the first RNTI. In some examples of the method, apparatus, and non-transitory computer-readable medium described above, the RNTI corresponding to the DCI message may be used to successfully descramble cyclic redundancy check (CRC) bits attached to the DCI message.

A method for wireless communication is described. The method may include identifying, at a base station, a first type of control information to transmit to a UE in a DCI message, generating the DCI message for transmitting the first type of control information, utilizing at least one bit field in the DCI message to provide an indication corresponding to the first type of control information, where the indication provided by the at least one bit field is different from an indication provided by a respective bit field in another DCI message for a second type of control information, and transmitting the DCI message to the UE, where the DCI message includes an uplink or downlink transmission configuration for communicating with the base station, based at least in part on the at least one bit field in the DCI message.

An apparatus for wireless communication is described. The apparatus may include means for identifying a first type of control information to transmit to a UE in a DCI message, means for generating the DCI message for transmitting the first type of control information, means for utilizing at least one bit field in the DCI message to provide an indication corresponding to the first type of control information, where the indication provided by the at least one bit field is different from an indication provided by a respective bit field in another DCI message for a second type of control information, and means for transmitting the DCI message to the UE, where the DCI message includes an uplink or downlink transmission configuration for communicating with the base station, based at least in part on the at least one bit field in the DCI message.

Another apparatus for wireless communication is described. The apparatus may include a processor, memory in electronic communication with the processor, and instructions stored in the memory. The instructions may be operable to cause the processor to identify a first type of control information to transmit to a UE in a DCI message, generate the DCI message for transmitting the first type of control information, utilize at least one bit field in the DCI message to provide an indication corresponding to the first type of control information, where the indication provided by the at least one bit field is different from an indication provided by a respective bit field in another DCI message for a second type of control information, and transmit the DCI message to the UE, where the DCI message includes an uplink or downlink transmission configuration for communicating with the base station, based at least in part on the at least one bit field in the DCI message.

A non-transitory computer-readable medium for wireless communication is described. The non-transitory computer-readable medium may include instructions operable to cause a processor to identify a first type of control information to transmit to a UE in a DCI message, generate the DCI message for transmitting the first type of control information, utilize at least one bit field in the DCI message to provide an indication corresponding to the first type of control information, where the indication provided by the at least one bit field is different from an indication provided by a respective bit field in another DCI message for a second type of control information, and transmit the DCI message to the UE, where the DCI message includes an uplink or downlink transmission configuration for communicating with the base station, based at least in part on the at least one bit field in the DCI message.

In some examples of the method, apparatus, and non-transitory computer-readable medium described above, the first type of control information includes paging information, and utilizing the at least one bit field in the DCI message to provide an indication corresponding to the first type of control information includes utilizing the at least one bit field in the DCI message as a short message indicator. In some examples of the method, apparatus, and non-transitory computer-readable medium described above, the short message indicator indicates whether the DCI message comprises a short paging message. In some examples of the method, apparatus, and non-transitory computer-readable medium described above, the DCI message contains paging scheduling information. In some examples of the method, apparatus, and non-transitory computer-readable medium described above, CRC bits of the DCI message may be scrambled using a P-RNTI.

In some examples of the method, apparatus, and non-transitory computer-readable medium described above, the first type of control information includes system information, and utilizing the at least one bit field in the DCI message to provide an indication corresponding to the first type of control information includes utilizing the at least one bit field in the DCI message as a system information format indicator or a short system information indicator. In some examples of the method, apparatus, and non-transitory computer-readable medium described above, CRC bits of the DCI message may be scrambled using a SI-RNTI.

In some examples of the method, apparatus, and non-transitory computer-readable medium described above, the first type of control information includes random access information, and utilizing the at least one bit field in the DCI message to provide an indication corresponding to the first type of control information includes utilizing the at least one bit field in the DCI message to indicate a configuration for a Msg3 transmission. In some examples of the method, apparatus, and non-transitory computer-readable medium described above, the configuration for the Msg3 transmission indicates whether the UE should transmit a beam index in the Msg3 transmission. In some examples of the method, apparatus, and non-transitory computer-readable medium described above, the beam index corresponds to a synchronization signal block index or a CSI-RS index. In some examples of the method, apparatus, and non-transitory computer-readable medium described above, CRC bits of the DCI message may be scrambled using a RA-RNTI.

In some examples of the method, apparatus, and non-transitory computer-readable medium described above, the first type of control information includes a grant, and utilizing the at least one bit field in the DCI message to provide an indication corresponding to the first type of control information includes utilizing the at least one bit field in the DCI message as a DCI format identifier, a TPC command for scheduled PUCCH, a PUCCH resource indicator, a PDSCH-to-HARQ feedback timing indicator, a new data indicator, a redundancy version indicator, or a HARQ process number. In some examples of the method, apparatus, and non-transitory computer-readable medium described above, CRC bits of the DCI message may be scrambled using a C-RNTI.

BRIEF DESCRIPTION OF THE DRAWINGS

FIGS. 3-6 illustrate examples of DCI messages transmitted using a particular DCI format that includes multipurpose bit fields and other bit fields in accordance with aspects of the present disclosure;

DETAILED DESCRIPTION

In some wireless communications systems, a base station may transmit downlink control information (DCI) to a user equipment (UE) to provide configurations to the UE for communicating with the base station. In such systems, the base station may use a predefined DCI format for transmitting the DCI to the UE. The DCI format may include various predefined bit fields that each correspond to a particular type of information (e.g., a particular indication), and the base station may identify a DCI format to use for a transmission of a DCI message based on a type of control information to be included in the DCI message.

In some cases, the same DCI format may be used for transmitting different types of control information. For example, DCI format 1_0 may be used for transmitting control information for paging, control information for system information transmissions, control information for random access transmissions, or general grants. In such cases, if a DCI format includes fixed predefined fields corresponding to a particular type of information, the information conveyed by these fields may not be useful for all control information transmissions. As a result, these fields may not be used (e.g., may be frozen) in certain control information transmissions, resulting in wasted resources. Further, if a DCI format includes bit fields that provide information that a UE may be able to determine otherwise, the information conveyed by these fields may not be useful, and the resources used to transmit information in these bit fields may be wasted.

As described herein, a wireless communications system may support efficient techniques for including appropriate information in the bit fields of a DCI message transmitted using a particular DCI format, which may serve to limit overhead and the amount of resources wasted in a control information transmission. In some aspects, a base station may determine appropriate information to include in bit fields of a DCI message based on the type of control information in the DCI message.

Aspects of the disclosure introduced above are described below in the context of a wireless communications system. Examples of processes and signaling exchanges that support multipurpose DCI bit fields are then described. Aspects of the disclosure are further illustrated by and described with reference to apparatus diagrams, system diagrams, and flowcharts that relate to multipurpose DCI bit fields.

Figure 1:
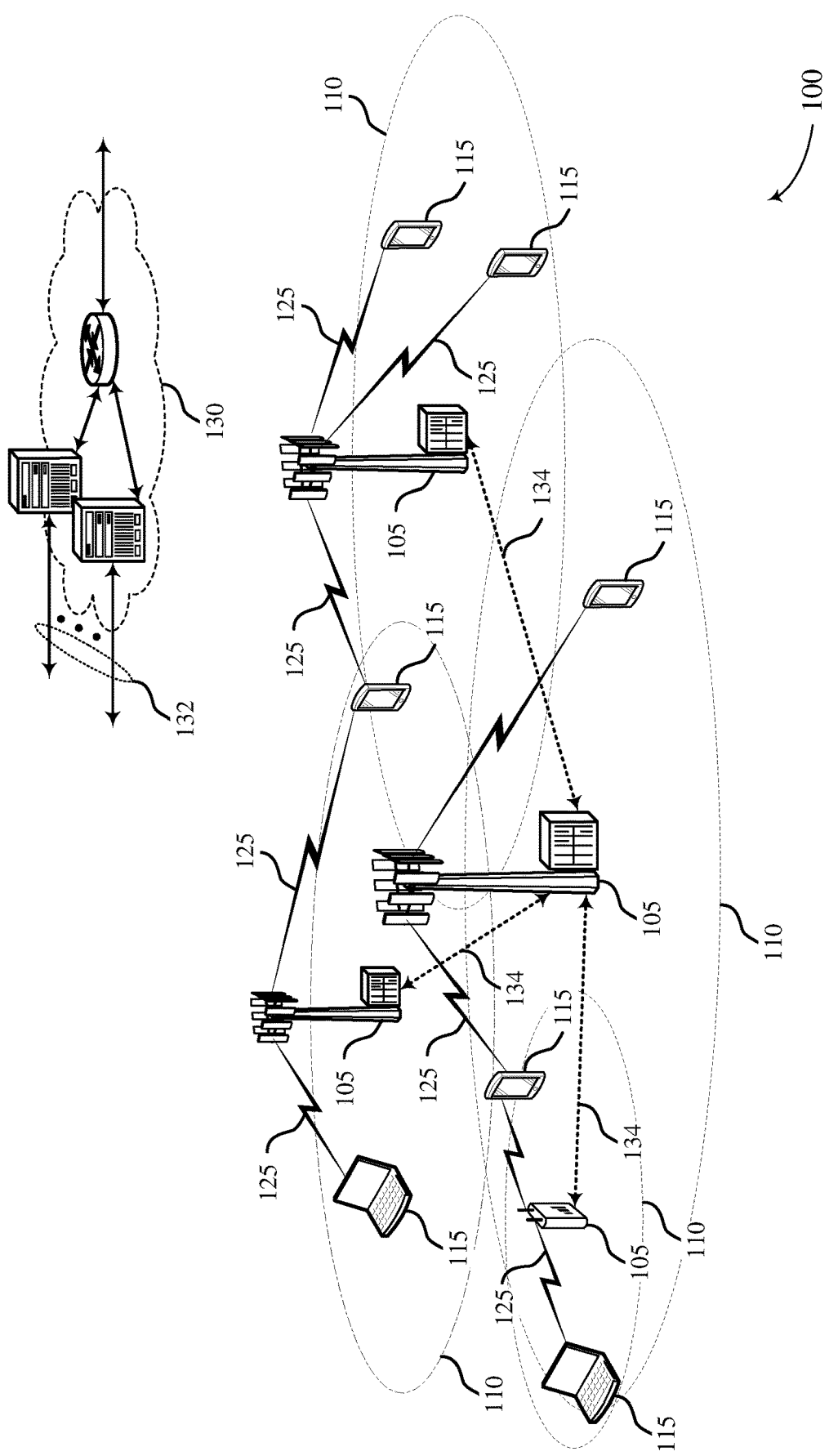
FIGS. 1 and 2 illustrate examples of wireless communications systems that support multipurpose downlink control information (DCI) bit fields in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. A base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and may therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operator's IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, UEs 115 and base stations 105 may support retransmissions of data to increase the likelihood that data is received successfully. Hybrid automatic repeat request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ T. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Wireless communications system 100 may support control signaling between base stations 105 and UEs 115, such that these devices may be able to identify appropriate configurations for communicating with each other. In the case of downlink control signaling, a base station 105 may transmit DCI to a UE 115, in order to provide scheduling information, timing information, and other control information. In some cases, a base station 105 may transmit, to a UE 115, a DCI message using a particular DCI format (e.g., DCI format 1_0). The base station 105 may identify a DCI format to use for a DCI transmission based on a type of control information being transmitted. A DCI format may include predefined bit fields used to provide specific information to a receiving UE 115. For example, DCI format 1_0 may include a DCI format identifier bit field that indicates whether a transmitted DCI message provides scheduling information for an uplink or downlink transmission.

In some cases, a single DCI format may be used to transmit different types of control information. For instance, DCI format 1_0 may be used to transmit control information for scheduling a downlink data transmission, a paging transmission, a system information transmission, etc. In such cases, some bit fields in a DCI format may not be used (e.g., may be frozen) in a transmission of a certain type of control information. Accordingly, the resources used for the transmission of these bit fields may be wasted. Additionally, some bit fields in a DCI format may include information that a receiving UE 115 may be able to determine otherwise (i.e., redundant information), leading to resources being wasted.

As an example, for a transmission of control information for paging, once a UE 115 decodes a DCI message using a paging radio network temporary identifier (RNTI) (P-RNTI), the UE may determine that the DCI message includes control information for scheduling a paging message. In some circumstances, the paging DCI message may contain paging scheduling information, based in part on the absence of a short paging message. Further, the presence (or absence) of the short paging message may be indicated via the short message indicator in the paging DCI message. Because a paging message is a downlink message, the UE 115 may be able to determine that the control information in the DCI is used for scheduling a downlink message. Thus, the bit field in the DCI format used to indicate whether a transmitted DCI message is used for scheduling a downlink transmission may not be useful to the UE 115 (i.e., may be redundant). In addition, because the UE 115 may not be required to transmit a response to a paging message, bit fields used to specify configurations for an uplink transmission may not be used.

Wireless communications system 100 may support efficient techniques for determining appropriate information to include in bit fields in a DCI message to limit the underutilization of resources in a control information transmission. Specifically, a base station 105 may determine appropriate information to include in bit fields in a DCI message based on a type of control information transmitted in the DCI message. As a result, the information conveyed in the bit fields in a DCI message transmitted using a particular DCI format may be related to the control information being transmitted in the DCI message. Further, when a base station 105 identifies additional control information (e.g., a short paging message) to transmit to a UE 115 for a certain type of communication (e.g., paging), the base station may use existing bit fields in a DCI format to transmit the additional control information, rather than introducing new bit fields to the DCI format. For instance, the existing bit fields (e.g., a 2-bit field) in the DCI format (e.g., DCI format 1_0) may be used to transmit information pertaining to the different paging DCI types. In one example, three (3) types of paging DCI may be conveyed through the use of the existing bit fields, such as short paging message, paging scheduling information, and a combination of short paging message and paging scheduling information. In some examples, bit fields may further be used to indicate different types of short paging messages (e.g., short paging messages of different lengths or sizes).

Figure 2:
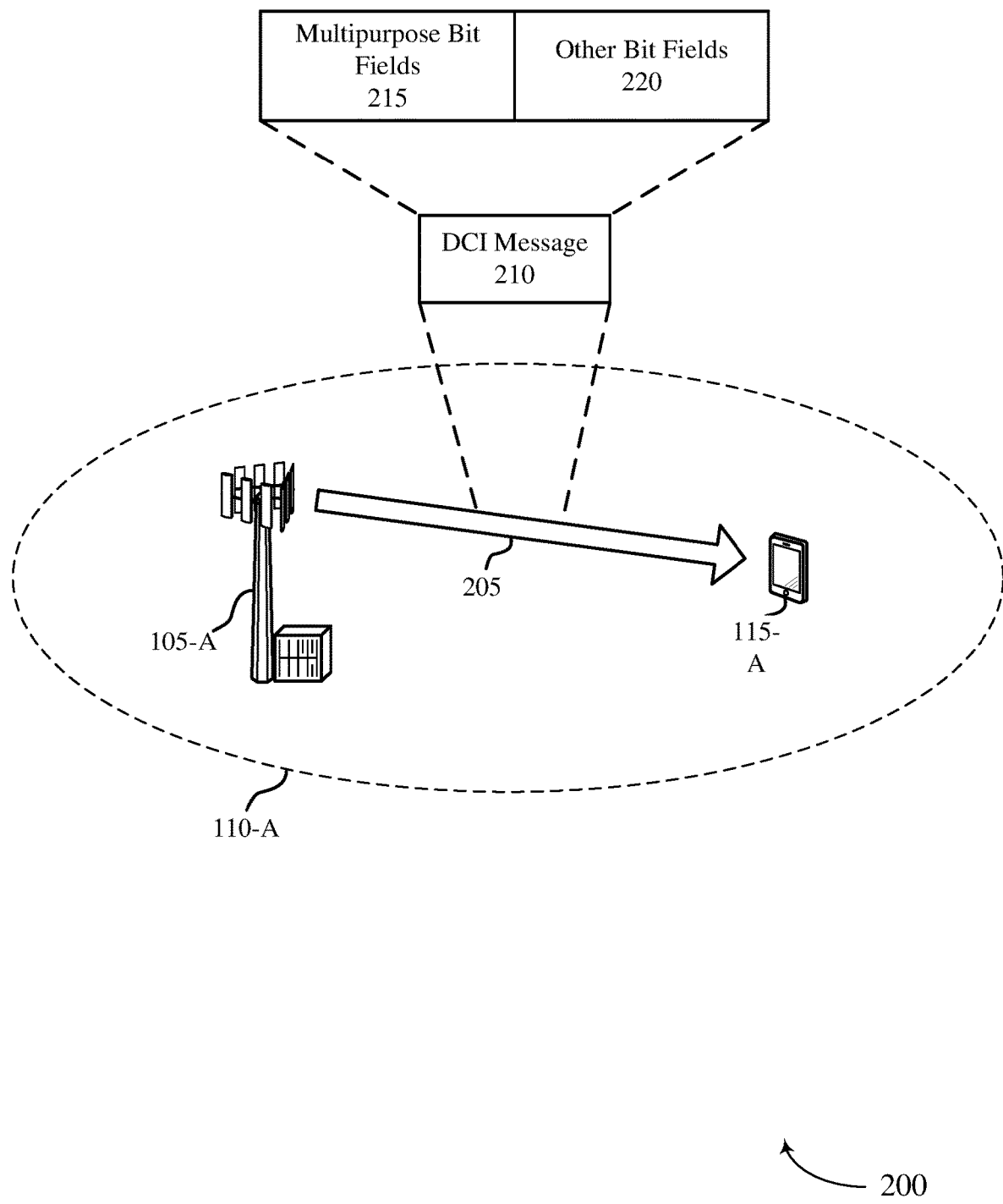

FIG. 2 illustrates an example of a wireless communications system 200 that supports multipurpose DCI bit fields in accordance with various aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. For example, base station 105-a may communicate with UE 115-a on resources of a carrier 205. Wireless communications system 200 may implement aspects of wireless communications system 100. In some aspects, wireless communications system 200 may support efficient techniques for determining appropriate (e.g., minimum) information to include in bit fields in a DCI message, in order to limit the amount of resources wasted in a control information transmission.

In wireless communications system 200, base station 105-a may transmit a DCI message 210 to UE 115-a to configure UE 115-a for communications with base station 105-a. As described herein, DCI message 210 may include multipurpose bit fields 215 and other bit fields (e.g., fixed bit fields). Multipurpose bit fields 215 may be used to provide different indications to UE 115-a depending on the type of control information transmitted in DCI message 210. Accordingly, as the number of features supported by wireless communications system 200 increases, and additional control information used to support these features is introduced, this additional control information may be transmitted using existing bit fields instead of new bit fields, which may limit overhead in wireless communications system 200. FIGS. 3-6 illustrate examples of DCI messages 210 transmitted using a particular DCI format that includes multipurpose bit fields 215 and other bit fields 220.

In the example of FIG. 3, base station 105-a may transmit DCI message 210-a to schedule a downlink data transmission (e.g., in a physical downlink shared channel (PDSCH)) to UE 115-a. Using the techniques described herein, base station 105-a may determine appropriate fields to include in DCI message 210-a based on determining that DCI message 210-a is to be used to transmit control information for scheduling a downlink data transmission. In this example, base station 105-a may include an identifier for DCI formats, a TPC command for scheduled physical uplink control channel (PUCCH), a PUCCH resource indicator, and a PDSCH-to-HARQ feedback timing indicator in multipurpose bit fields 215. In some cases, base station 105-a may then transmit DCI message 210-a to UE 115-a.

UE 115-a may receive DCI message 210-a, and may determine the type of control information included in DCI message 210-a (e.g., scheduling information for a downlink data transmission). In one example, UE 115-a may determine the type of control information included in DCI message 210-a based on the RNTI (e.g., a cell RNTI (C-RNTI)) used to decode DCI message 210-a. That is, UE 115-a may determine the type of control information included in DCI message 210-a based on the RNTI used to successfully descramble the CRC bits attached to DCI message 210-a. In another example, UE 115-a may determine the type of control information included in DCI message 210-a based on the time and/or frequency location of resources used to transmit DCI message 210-a.

Once UE 115-a identifies the type of control information included in DCI message 210-a, UE 115-a may interpret the bit fields in DCI message 210-a based on the identification and the RNTI. In this example, UE 115-a may determine that the DCI message 210-a includes control information for scheduling a downlink data transmission, and UE 115-a may interpret the multipurpose bit fields 215 based on this determination. In particular, UE 115-a may determine that multipurpose bit fields 215 include an identifier for DCI formats, a TPC command for scheduled PUCCH, a PUCCH resource indicator, and a PDSCH-to-HARQ feedback timing indicator. Further, in some cases, the UE 115-a may use these fields to identify appropriate configurations for receiving downlink data from base station 105-a, and transmitting feedback to the base station 105-a. In some examples, the type of control information included in the DCI message comprises paging information, system information, or random access information, and the UE 115-a may interpret the at least one bit field in the DCI message as a short message indicator, a system information format indicator or a short system information indicator, or a configuration for Msg3 transmission, respectively. In some cases, the short message indicator may indicate whether the DCI message comprises a short paging message. In some aspects, the DCI message may comprise paging scheduling information, for instance, when the RNTI comprises a P-RNTI.

In the example of FIG. 4, base station 105-a may transmit DCI message 210-b to UE 115-a including control information for paging. Using the techniques described herein, base station 105-a may determine appropriate fields to include in DCI message 210-b based on determining that DCI message 210-b is to be used to carry control information for paging. In this example, base station 105-a may include a short message indicator, and other paging indicators in multipurpose bit fields 215 of the DCI message 210-b. The short message indicator may be used to indicate whether the DCI message 210-b includes a short paging message or scheduling information for an upcoming paging message, and the other paging indicators may be used to provide other control information related to paging. In some cases, base station 105-a may then transmit DCI message 210-b to UE 115-a.

UE 115-a may receive DCI message 210-b and may determine the type of control information included in DCI message 210-b (i.e., control information for paging). In one example, UE 115-a may determine the type of control information included in DCI message 210-b based on the RNTI (e.g., a paging RNTI (P-RNTI)) used to decode DCI message 210-b. That is, UE 115-a may determine the type of control information included in DCI message 210-b based on the RNTI used to successfully descramble the CRC bits attached to DCI message 210-b. In another example, UE 115-a may determine the type of control information included in DCI message 210-b based on the time and/or frequency location of resources used to transmit DCI message 210-b.

In some cases, once UE 115-a identifies the type of control information included in DCI message 210-b, UE 115-a may interpret the bit fields in DCI message 210-b based on the identification. In this example, UE 115-a may determine that DCI message 210-b includes control information for paging, and UE 115-a may interpret the multipurpose bit fields 215 based on this determination. In particular, UE 115-a may determine that multipurpose bit fields 215 include a short message indicator and other paging indicators, and UE 115-a may use these fields to identify appropriate configurations for receiving a downlink paging message from base station 105-*a*. For instance, the multipurpose bit fields 215 (e.g., a 2-bit field) in the DCI format (e.g., DCI format 1_0) may be used to transmit information pertaining to the different paging DCI message types. In one example, DCI message 210-*b* may be one of three (3) types of paging DCI. Further, the type of paging DCI may be conveyed through the use of an existing bit field. In some cases, the three types of paging DCI may include short paging message, paging scheduling information, and a combination of short paging message and paging scheduling information. In some examples, a two (2) bit field may further be used to indicate different types of short paging messages (e.g., short paging messages of different lengths or sizes). For instance, 00 may indicate "Reserved" in the paging DCI, 01 may indicate the paging DCI is associated with paging scheduling information, 10 may indicate a short paging message (e.g., a 40-bit short paging message), and 11 may indicate both paging scheduling, and short paging messages (e.g., a 10-bit short paging message).

In the example of FIG. 5, base station 105-*a* may transmit DCI message 210-*c* to UE 115-*a* including control information for a system information transmission. Using the techniques described herein, base station 105-*a* may determine appropriate fields to include in DCI message 210-*c* based on determining that DCI message 210-*c* is to be used to carry control information for a system information transmission. In this example, base station 105-*a* may include a system information format indicator, a short system information indicator, and other system information indicators in multipurpose bit fields 215 of the DCI message 210-*c*. In some cases, the system information format indicator may indicate whether a scheduled system information transmission includes remaining minimum system information (RMSI) or other system information (OSI); the short system information indicator may indicate whether the DCI message 210-*c* includes a short system information message or scheduling information an upcoming system information transmission; and the other system information indicators may be used to provide other control information related to a system information transmission. Base station 105-*a* may then transmit DCI message 210-*c* to UE 115-*a*.

UE 115-*a* may receive DCI message 210-*c* and may determine the type of control information included in DCI message 210-*c* (i.e., control information for a system information transmission). In one example, UE 115-*a* may determine the type of control information included in DCI message 210-*c* based on the RNTI (e.g., a system information RNTI (SI-RNTI)) used to decode DCI message 210-*c*. That is, UE 115-*a* may determine the type of control information included in DCI message 210-*c* based on the RNTI used to successfully descramble the CRC bits attached to DCI message 210-*c*. In another example, UE 115-*a* may determine the type of control information included in DCI message 210-*c* based on the time and/or frequency location of resources used to transmit DCI message 210-*c*.

Once UE 115-*a* identifies the type of control information included in DCI message 210-*c*, the UE 115-*a* may interpret the bit fields in DCI message 210-*c* based on the identification. In this example, UE 115-*a* may determine that DCI message 210-*c* includes control information for a system information transmission, and UE 115-*a* may interpret the multipurpose bit fields 215 based on this determination. In particular, UE 115-*a* may determine that multipurpose bit fields 215 include a system information format indicator, a short system information indicator, and other system information indicators, and UE 115-*a* may use these fields to identify appropriate configurations for receiving a downlink system information transmission from base station 105-*a*.

In the example of FIG. 6, base station 105-*a* may transmit DCI message 210-*d* to UE 115-*a*, which may include control information for a random access message (e.g., a random access response (RAR) message). Using the techniques described herein, the base station 105-*a* may determine appropriate fields to include in the DCI message 210-*d*, for instance, based on determining that DCI message 210-*d* carries control information for a random access message. In this example, base station 105-*a* may include an indication of a configuration for a Message 3 (Msg3) transmission, a TPC command for scheduled PUCCH, a PUCCH resource indicator, and at least one other random access indicator in multipurpose bit fields 215 of the DCI message 210-*d*.

In some examples, the configuration for the Msg3 transmission may indicate whether UE 115-*a* should include a beam report including a beam index in the Msg3 transmission (e.g., to allow base station 105-*a* to identify an appropriate beam for communicating with UE 115-*a*), where the beam index corresponds to a synchronization signal block index, or a channel state information reference signal (CSI-RS) index. In other examples, the configuration may indicate whether the UE 115-*a* should transmit Msg3 on primary uplink resources (e.g., on resources of a paired carrier), or on supplementary uplink resources (e.g., on resources of an unpaired carrier). In some aspects, the TPC command for scheduled PUCCH may indicate a transmit power for a Msg3 transmission, whereas the PUCCH resource indicator may indicate resources for a Msg3 transmission. Further, in some cases, the other random access indicator may be used to provide other control information related to a random access procedure to the UE 115-*a*.

In some cases, UE 115-*a* may receive DCI message 210-*d* transmitted from the base station 105-*a*, and may determine the type of control information included in the DCI message 210-*d* (i.e., control information for a random access message). In one example, UE 115-*a* may determine the type of control information included in DCI message 210-*d* based on the RNTI (e.g., a random access RNTI (RA-RNTI)) used to decode DCI message 210-*d*. That is, UE 115-*a* may determine the type of control information included in DCI message 210-*d* based on the RNTI used to successfully descramble the CRC bits attached to DCI message 210-*d*. In another example, UE 115-*a* may determine the type of control information included in DCI message 210-*d* based on the time and/or frequency location of resources used to transmit DCI message 210-*d*.

In some circumstances, the UE 115-*a* may identify the type of control information included in DCI message 210-*d*, and may interpret the bit fields in DCI message 210-*d* based in part on the identification. In this example, UE 115-*a* may determine that DCI message 210-*d* includes control information for a random access message, and the UE 115-*a* may interpret the multipurpose bit fields 215 based on this determination. In particular, UE 115-*a* may determine that multipurpose bit fields 215 include an indication of a configuration for a Msg3 transmission, a TPC command for scheduled PUCCH, a PUCCH resource indicator, and another random access indicator. Further, the UE 115-*a* may use these fields to identify appropriate configurations for receiving a random access message from base station 105-*a*, and transmitting a Msg3 to base station 105-*a*.

In the examples of FIGS. 3-6, base station 105-*a* may use the other bit fields 220 to provide the same information for DCI messages carrying different types of information. Specifically, because the information provided by the other bit fields 220 may be useful for different types of control information, it may be appropriate for base station 105-a to include this information in all DCI messages carrying the different types of control information. In some cases, however, the other bit fields illustrated in FIGS. 3-6 may be used as multipurpose bit fields if these bit fields are not being used in a transmission of a certain type of control information. For example, for a transmission of paging control information using DCI format 1_0, the new data indicator field, redundancy version field, and the HARQ process number field may not be used (e.g., may be frozen). Thus, in some aspects, these fields may be used to carry control information related to paging (e.g., other paging control information).

Figure 7:
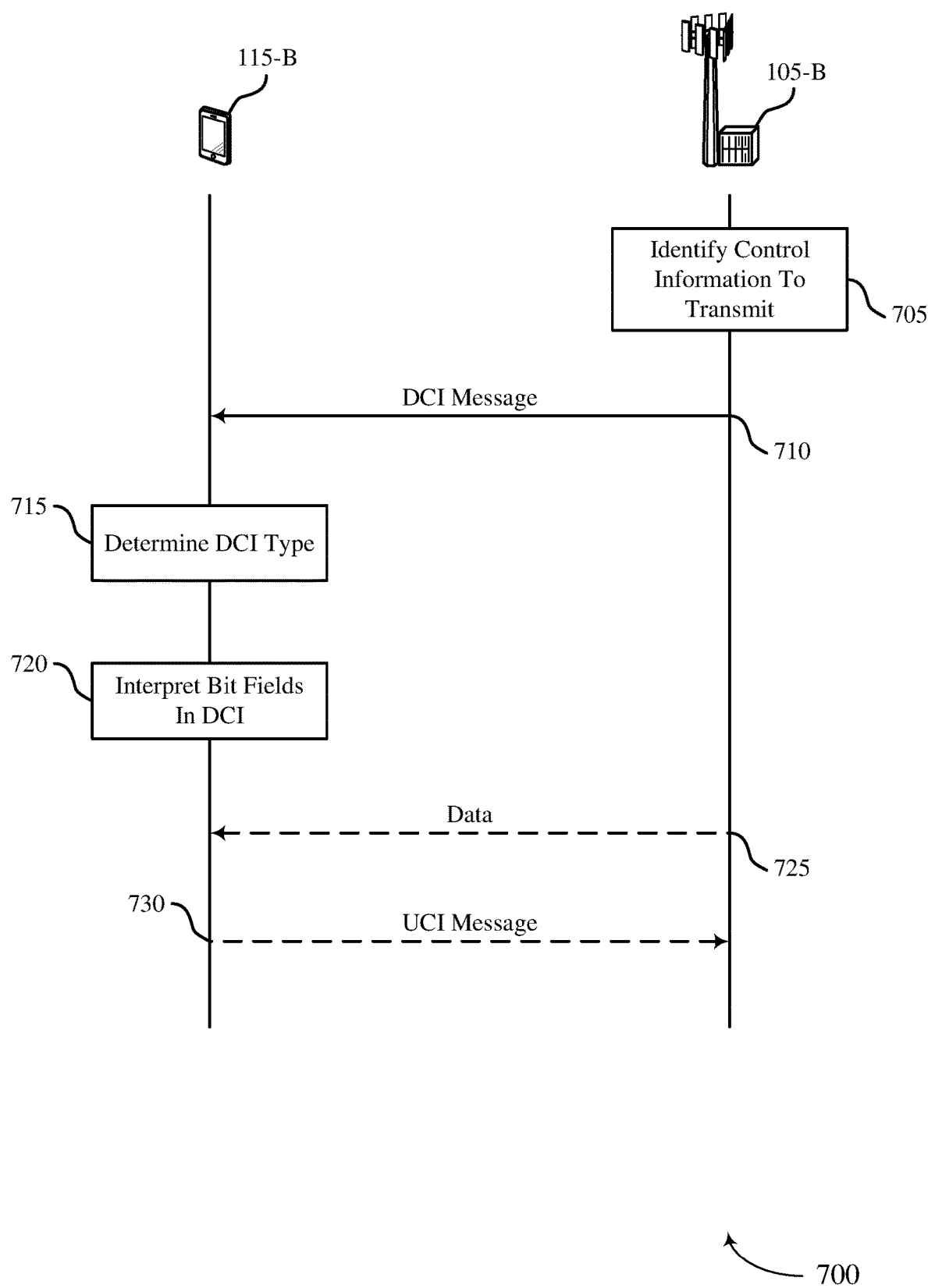
FIG. 7 illustrates an example of a process flow in accordance with aspects of the present disclosure.

FIG. 7 illustrates an example of a process flow 700 in accordance with various aspects of the present disclosure. Process flow 700 illustrates aspects of techniques performed by a base station 105-b, which may be an example of a base station described with reference to FIGS. 1-6. Process flow 700 also illustrates aspects of techniques performed by a UE 115-b, which may be an example of a UE described with reference to FIGS. 1-6.

At 705, base station 105-b may identify a first type of control information to transmit to UE 115-b in a DCI message. Base station 105-b may then generate the DCI message for transmitting the first type of control information, and, at 710, base station 105-b may transmit the DCI message to UE 115-b. As described with reference to FIGS. 3-6, base station 105-b may use at least one bit field in the DCI message to provide an indication corresponding to the first type of control information, where the indication provided by the at least one bit field may be different from an indication provided by a respective bit field in another DCI message for a second type of control information.

At 710, UE 115-b may then receive and decode the DCI message. At 715, UE 115-b may determine a type of control information included in the DCI message based at least in part on the RNTI. In one example, UE 115-b may identify the RNTI used to successfully descramble the CRC bits attached to the DCI message, and the UE 115-b may determine the type of control information included in the DCI message based on the identified RNTI (e.g., based on whether the RNTI is a channel-dependent RNTI, such as a P-RNTI, SI-RNTI, or an RA-RNTI; or based on whether the RNTI is a UE-dependent RNTI, such as a C-RNTI). In another example, UE 115-b may determine the time and/or frequency location of resources used to transmit the DCI message, and UE 115-b may determine the type of control information included in the DCI message based on this determination.

At 720, UE 115-b may then interpret the bit fields in the DCI message based on determining the type of control information included in the DCI message (i.e., the first type of control information as described above). For instance, UE 115-b may interpret a bit field in the DCI message as a first indication if UE 115-b determines that the DCI message includes a first type of control information (e.g., based on determining that a first RNTI was used to successfully descramble the CRC bits of the DCI message), and UE 115-b may interpret the bit field in the DCI message as a second indication if UE 115-b determines that the DCI message includes a second type of information (e.g., based on determining that a second RNTI was used to successfully descramble the CRC bits of the DCI message). Thus, as illustrated in FIGS. 3-6, the same bit field in DCI messages transmitted using a particular DCI format may be interpreted differently based on the type of control information included in the DCI messages.

As described with reference to FIG. 3, a base station may transmit control information for scheduling a downlink data transmission in a DCI message, and one or more bit fields in the DCI message (i.e., the multipurpose bit fields) may be interpreted based on the DCI message including control information for scheduling a downlink data transmission. As described with reference to FIG. 4, a base station may transmit control information for paging in a DCI message, and one or more bit fields in the DCI message (i.e., the multipurpose bit fields) may be interpreted based on the DCI message including control information for paging. As described with reference to FIG. 5, a base station may transmit control information for a system information transmission in a DCI message, and one or more bit fields in the DCI message (i.e., the multipurpose bit fields) may be interpreted based on the DCI message including control information for the system information transmission. As described with reference to FIG. 6, a base station may transmit control information for a random access transmission in a DCI message, and one or more bit fields in the DCI message (i.e., the multipurpose bit fields) may be interpreted based on the DCI message including control information for the random access transmission.

Once UE 115-b interprets the bit fields in the DCI message, UE 115-b may then process the bit fields in the DCI message based on the interpretation. In some circumstances, as part of the processing, the UE 115-b may determine an uplink or downlink transmission configuration for communicating with the base station 105-b based at least in part on interpreting the at least one bit field in the DCI message. In one example, UE 115-b may communicate with base station 105-b based on the control information received in the DCI message. For instance, at 725, UE 115-b may receive data (e.g., a paging message, a system information message, a random access message, or other data) from base station 105-b based on the control information, and, at 730, UE 115-b may transmit uplink control information to base station 105-b based on the DCI message and the data received at 725. In another example, UE 115-b may avoid communicating with base station 105-b (e.g., by transitioning to a sleep mode) based on the control information received in the DCI message.

Figure 8:
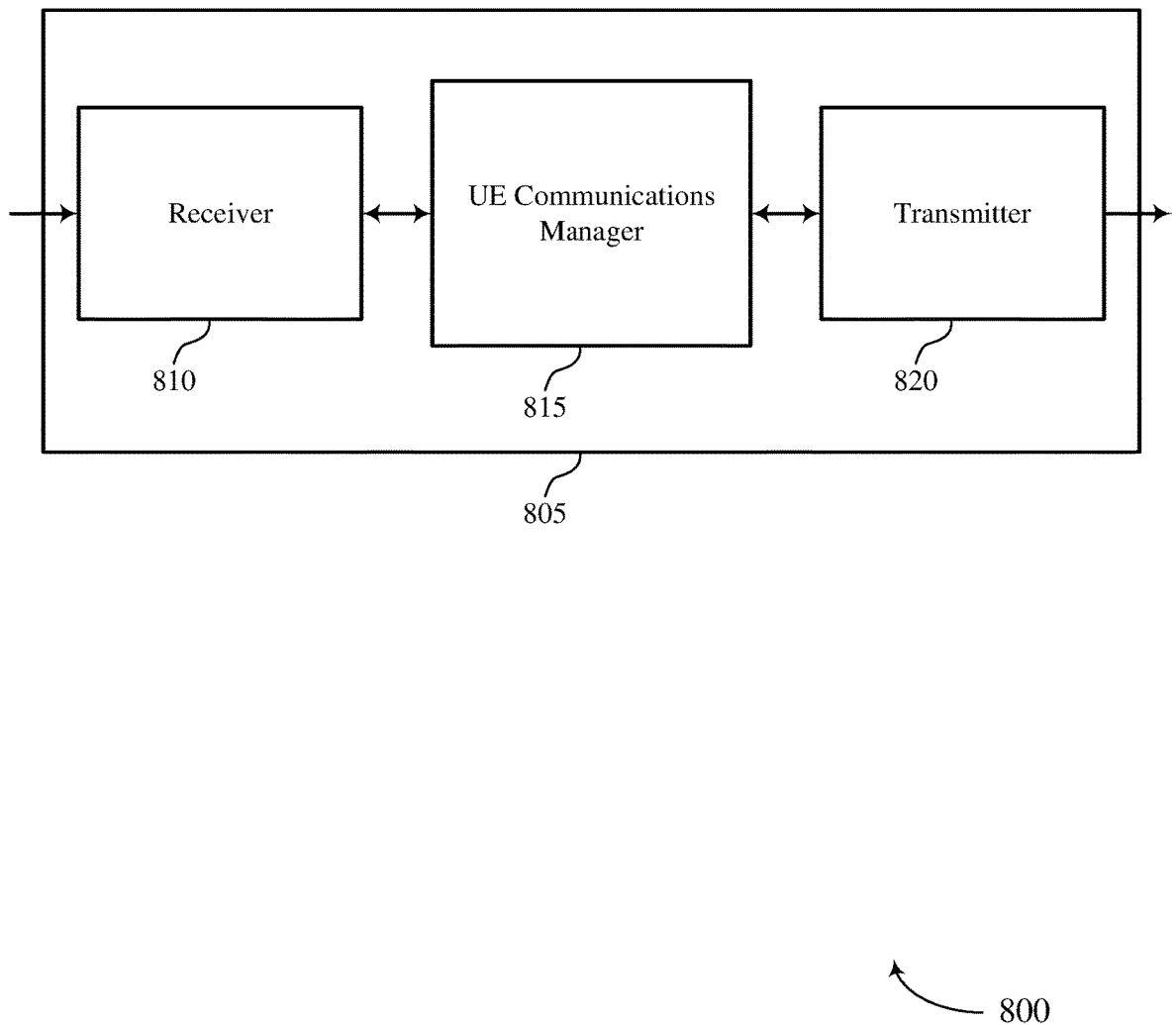
FIGS. 8-10 show block diagrams of a device that supports multipurpose DCI bit fields in accordance with aspects of the present disclosure.

FIG. 8 shows a block diagram 800 of a wireless device 805 that supports multipurpose DCI bit fields in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to multipurpose DCI bit fields, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof, in accordance with various aspects of the present disclosure.

UE communications manager 815 may monitor a control channel for DCI from a base station, identify a DCI message in the control channel corresponding to an RNTI, determine a type of control information included in the DCI message based on the RNTI, interpret at least one bit field in the DCI message based on the type of control information included in the DCI message, and process the at least one bit field in the DCI message based on the interpreting. In some circumstances, as part of the processing, UE communications manager 815 may determine an uplink or downlink transmission configuration for communicating with the base station based at least in part on interpreting the at least one bit field in the DCI message.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
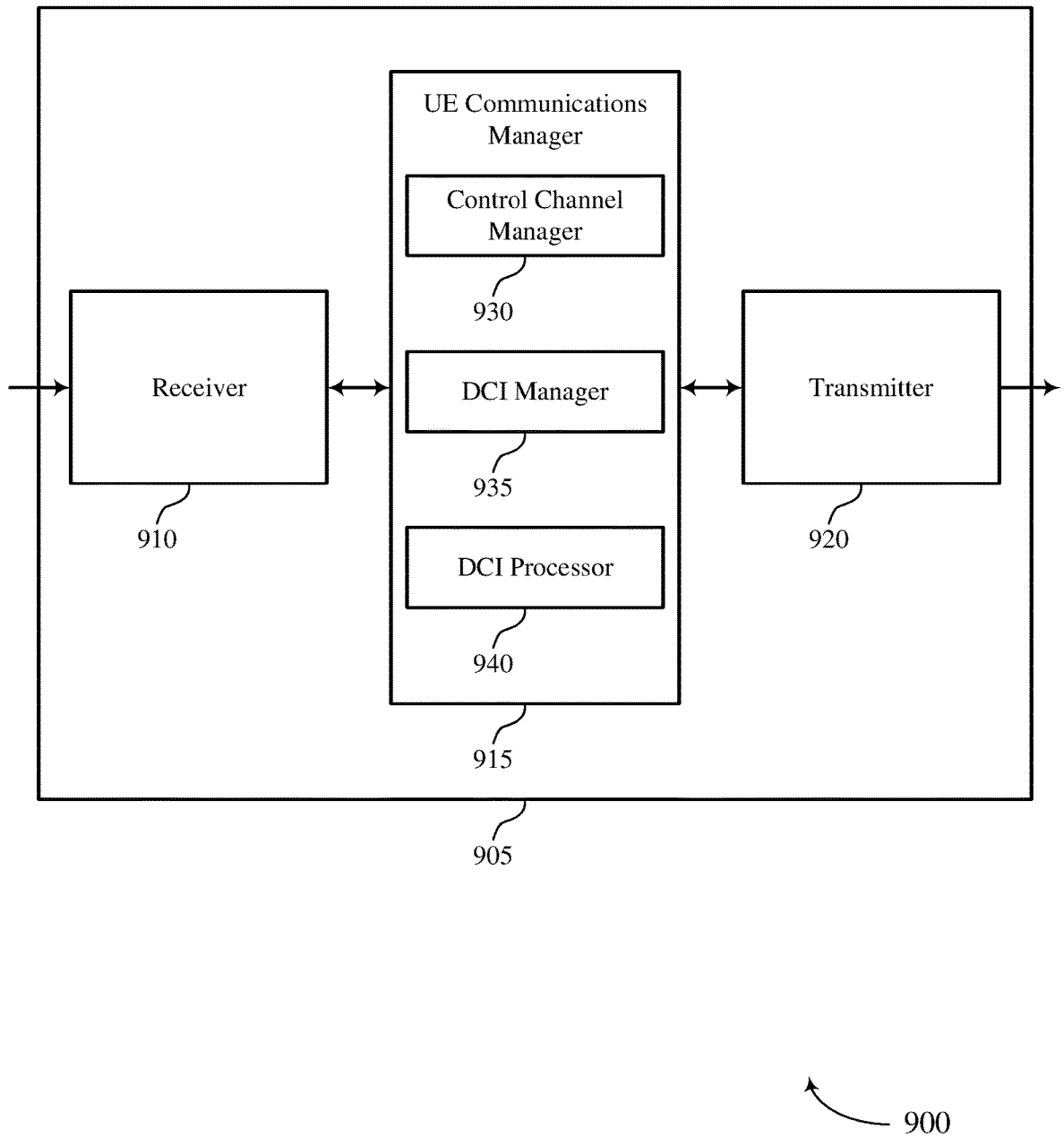

FIG. 9 shows a block diagram 900 of a wireless device 905 that supports multipurpose DCI bit fields in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to multipurpose DCI bit fields, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may include control channel manager 925, DCI manager 930, and DCI processor 935. Control channel manager 925 may monitor a control channel for DCI from a base station. DCI manager 930 may identify a DCI message in the control channel corresponding to an RNTI, determine a type of control information included in the DCI message based on the RNTI, and interpret at least one bit field in the DCI message based on the type of control information included in the DCI message and the RNTI. DCI processor 935 may then process the at least one bit field in the DCI message based on the interpreting. In some examples, the UE communications manager 915 may determine an uplink or downlink transmission configuration for communicating with the base station based at least in part on interpreting the at least one bit field in the DCI message.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
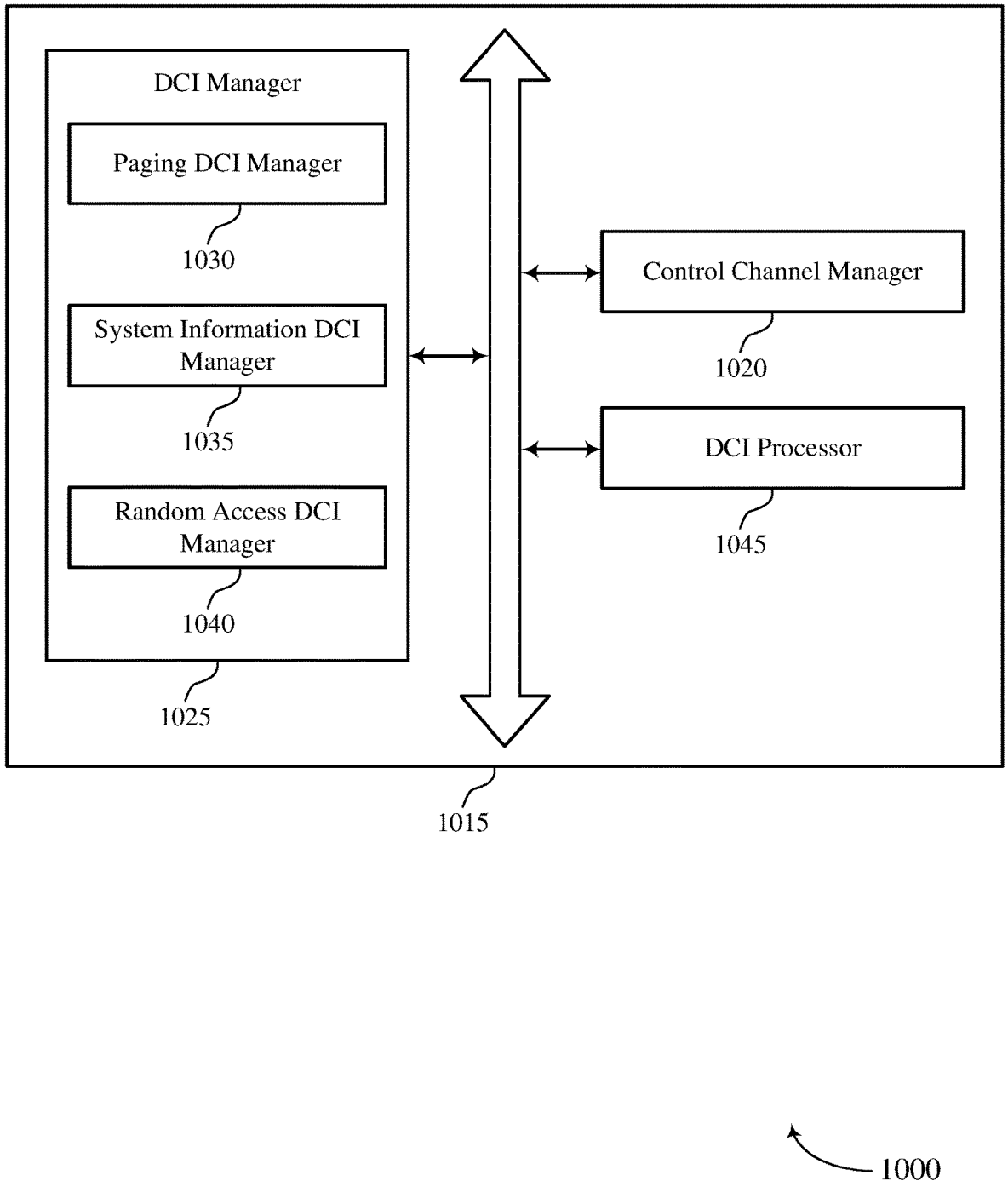

FIG. 10 shows a block diagram 1000 of a UE communications manager 1015 that supports multipurpose DCI bit fields in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include control channel manager 1020, DCI manager 1025, and DCI processor 1045. DCI manager 1025 may include paging DCI manager 1030, system information DCI manager 1035, and random access DCI manager 1040. Each of these modules may communicate, directly or indirectly, with one another (e.g., via one or more buses).

Control channel manager 1020 may monitor a control channel for DCI from a base station. DCI manager 1025 may then identify a DCI message in the control channel corresponding to an RNTI and determine a type of control information included in the DCI message based on the RNTI. In some cases, the RNTI corresponding to the DCI message is the RNTI used to successfully descramble CRC bits attached to the DCI message. Additionally, in some cases, DCI manager 1025 may identify resources used to transmit the DCI message and determine the type of control information included in the DCI message based on the resources used to transmit the DCI message.

Once DCI manager 1025 determines the type of control information included in the DCI message based at least in part on the RNTI, the DCI manager 1025 may then interpret the at least one bit field in the DCI message based on the type of control information included in the DCI message and the RNTI. In some cases, interpreting the at least one bit field in the DCI message includes interpreting the at least one bit field in the DCI message as a first indication when the RNTI includes a first RNTI, and interpreting the at least one bit field in the DCI message as a second indication when the RNTI includes a second RNTI that is different from the first RNTI. In some cases, the at least one bit field in the DCI message provides a different indication from a respective bit field in another DCI message including another type of control information. After DCI manager 1025 interprets the at least one bit field in the DCI message, DCI processor 1045 may then use this information to process the at least one bit field in the DCI message based on the interpreting. In some examples, the processing may comprise determining an uplink or downlink transmission configuration for communicating with the base station based at least in part on interpreting the at least one bit field in the DCI message.

In some cases, the type of control information included in the DCI message includes a grant (or a configuration for at least one of an uplink or downlink transmission), paging information, system information, random access information, a short paging message, paging PDSCH scheduling information, or a combination thereof. In some cases, if the type of information includes a grant, DCI manager 1025 may interpret the at least one bit field in the DCI message as a DCI format identifier, TPC command for scheduled PUCCH, a PUCCH resource indicator, a PDSCH-to-HARQ feedback timing indicator, a new data indicator, a redundancy version indicator, or a HARQ process number. In such cases, the RNTI includes a C-RNTI.

In some cases, the type of control information included in the DCI message includes paging information, and paging DCI manager 1030 may interpret the at least one bit field in the DCI message as a short message indicator. The short message indicator may indicate whether a short paging message is included in the DCI message, where the short paging message may be used to provide a system information modification, a commercial mobile alert system (CMAS) indication, or an earthquake and tsunami warning system (ETWS) indication. In some cases, the paging DCI message may comprise paging scheduling information, for instance, when the short paging message is absent. In such examples, the RNTI includes a P-RNTI. In some cases, the type of control information included in the DCI message includes system information, and system information DCI manager 1035 may interpret the at least one bit field in the DCI message as a system information format indicator or a short system information indicator. In such cases, the RNTI includes an SI-RNTI.

In some cases, the type of control information included in the DCI message includes random access information, and random access DCI manager 1040 may interpret the at least one bit field in the DCI message as a configuration for a Msg3 transmission. In such cases, the RNTI includes an RA-RNTI. In some cases, the configuration for the Msg3 transmission indicates whether to include a beam index in the Msg3 transmission. The beam index may correspond to a synchronization signal block index or a CSI-RS index. In other cases, the configuration for the Msg3 transmission indicates whether to include a CSI-RS report in the Msg3 transmission.

Figure 11:
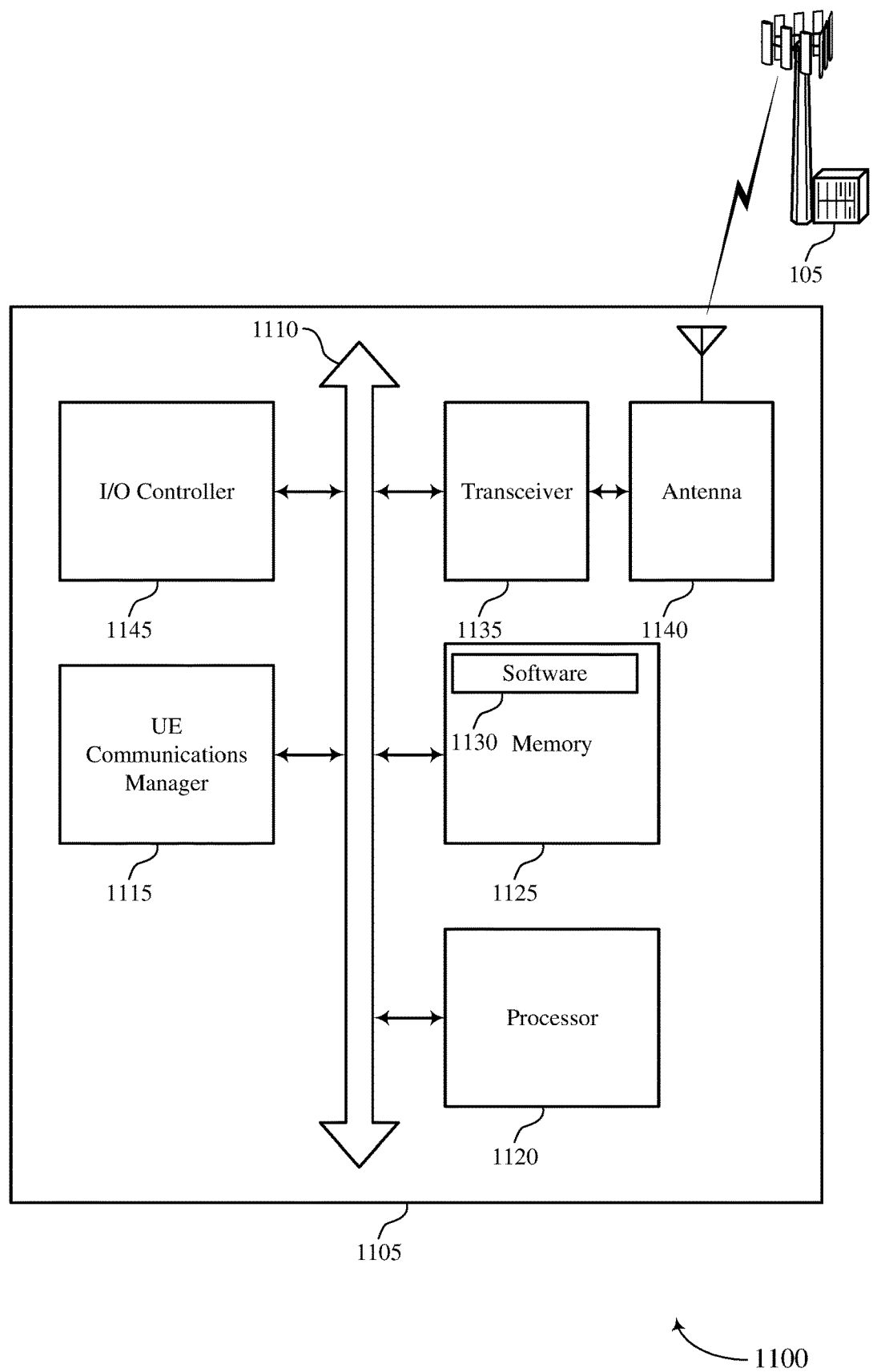
FIG. 11 illustrates a block diagram of a system including a user equipment (UE) that supports multipurpose DCI bit fields in accordance with aspects of the present disclosure.

FIG. 11 shows a diagram of a system 1100 including a device 1105 that supports multipurpose DCI bit fields in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support multipurpose DCI bit fields. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
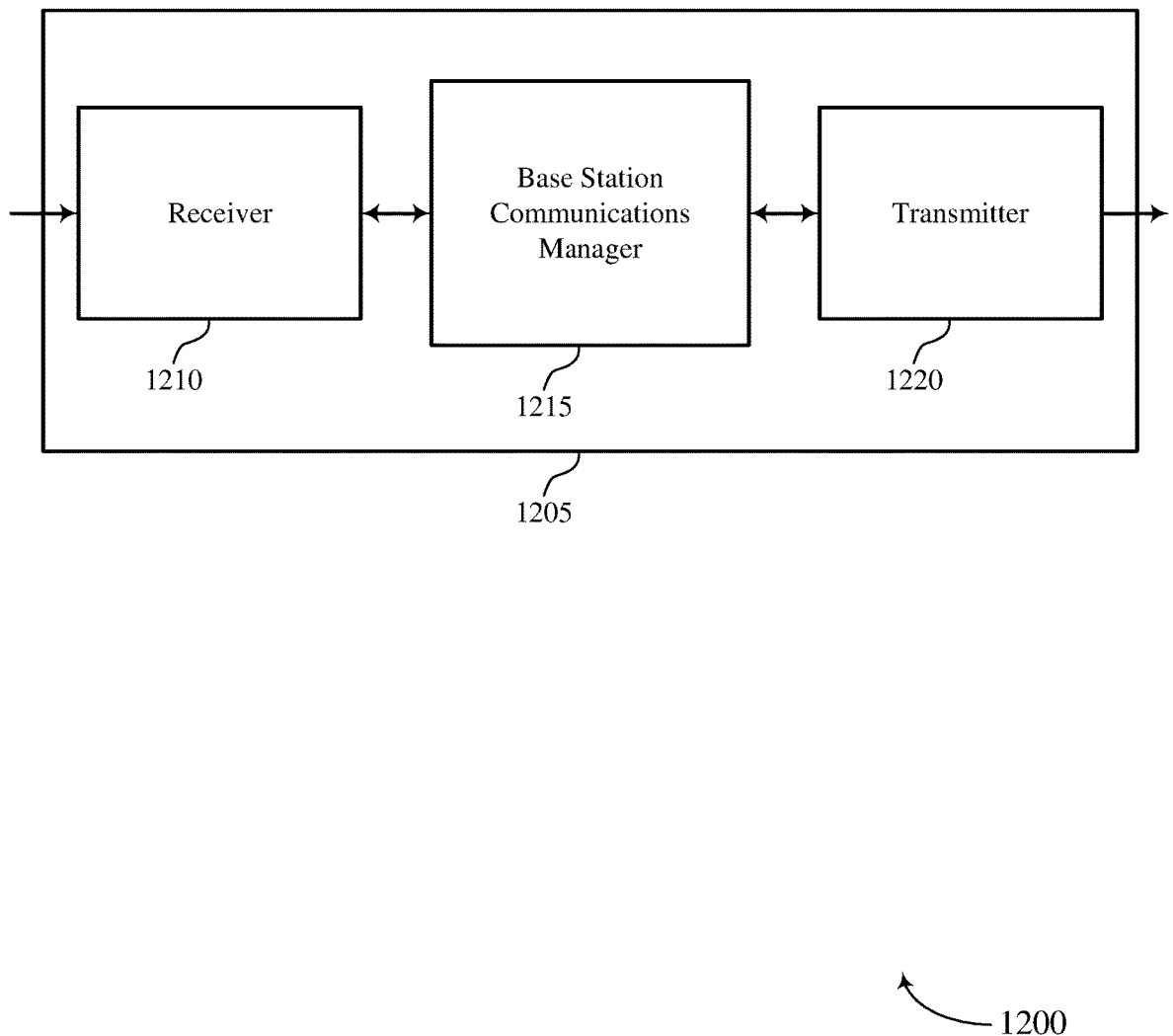
FIGS. 12-14 show block diagrams of a device that supports multipurpose DCI bit fields in accordance with aspects of the present disclosure.

FIG. 12 shows a block diagram 1200 of a wireless device 1205 that supports multipurpose DCI bit fields in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to multipurpose DCI bit fields, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may identify, at a base station, a first type of control information to transmit to a UE in a DCI message, generate the DCI message for transmitting the first type of control information, and utilize at least one bit field in the DCI message to provide an indication corresponding to the first type of control information, where the indication provided by the at least one bit field is different from an indication provided by a respective bit field in another DCI message for a second type of control information. Base station communications manager 1215 may then coordinate with transmitter 1220 to transmit the DCI message to the UE, where the DCI message includes an uplink or downlink transmission configuration for communicating with the base station, based at least in part on the at least one bit field in the DCI message.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
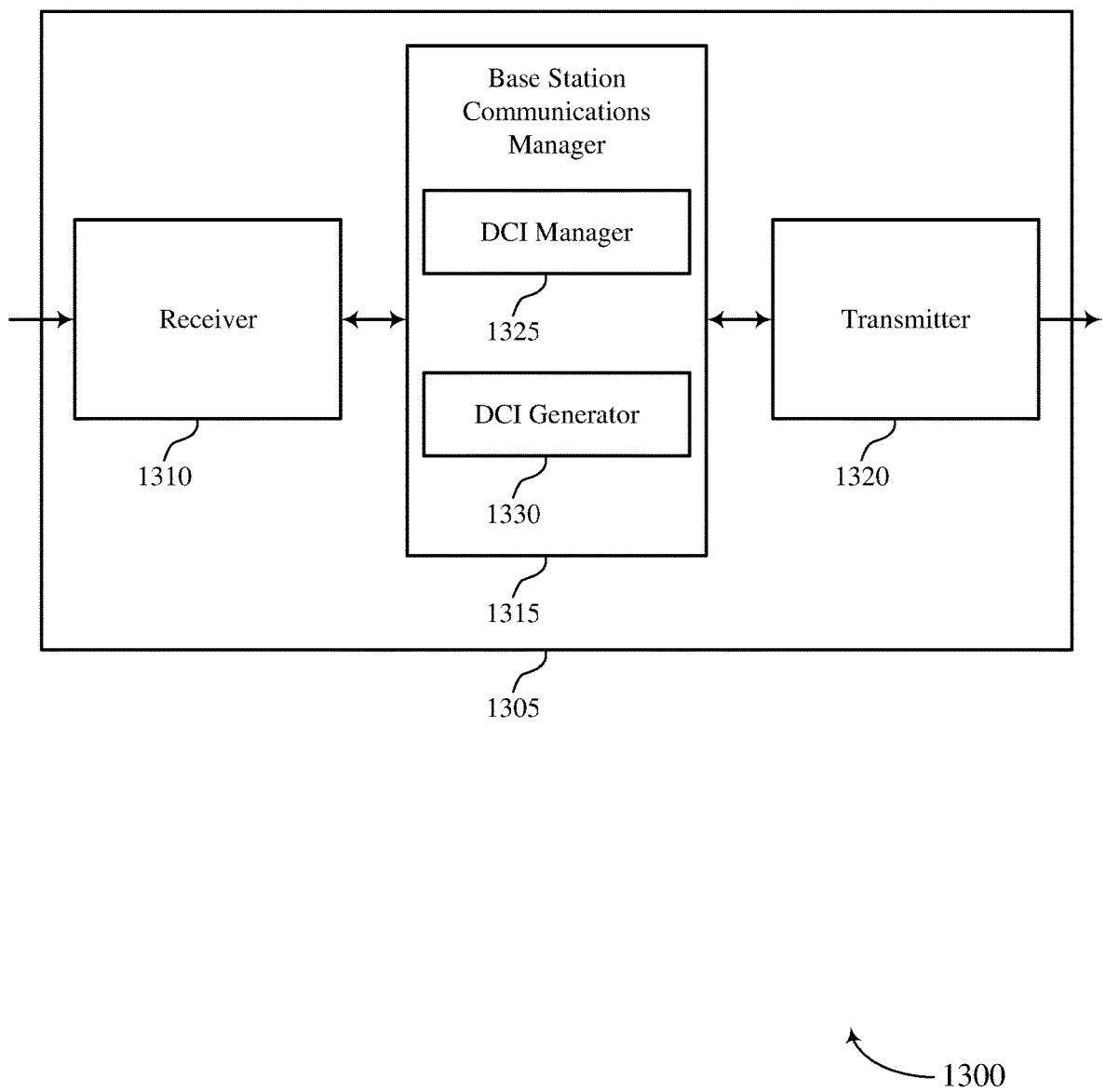

FIG. 13 shows a block diagram 1300 of a wireless device 1305 that supports multipurpose DCI bit fields in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to multipurpose DCI bit fields, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may include DCI manager 1325 and DCI generator 1330.

DCI manager 1325 may identify, at a base station, a first type of control information to transmit to a UE in a DCI message. DCI generator 1330 may then generate the DCI message for transmitting the first type of control information and utilize at least one bit field in the DCI message to provide an indication corresponding to the first type of control information, where the indication provided by the at least one bit field is different from an indication provided by a respective bit field in another DCI message for a second type of control information. Base station communications manager 1315 may then coordinate with transmitter 1320 to transmit the DCI message to the UE, where the DCI message includes an uplink or downlink transmission configuration for communicating with the base station, based at least in part on the at least one bit field in the DCI message.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
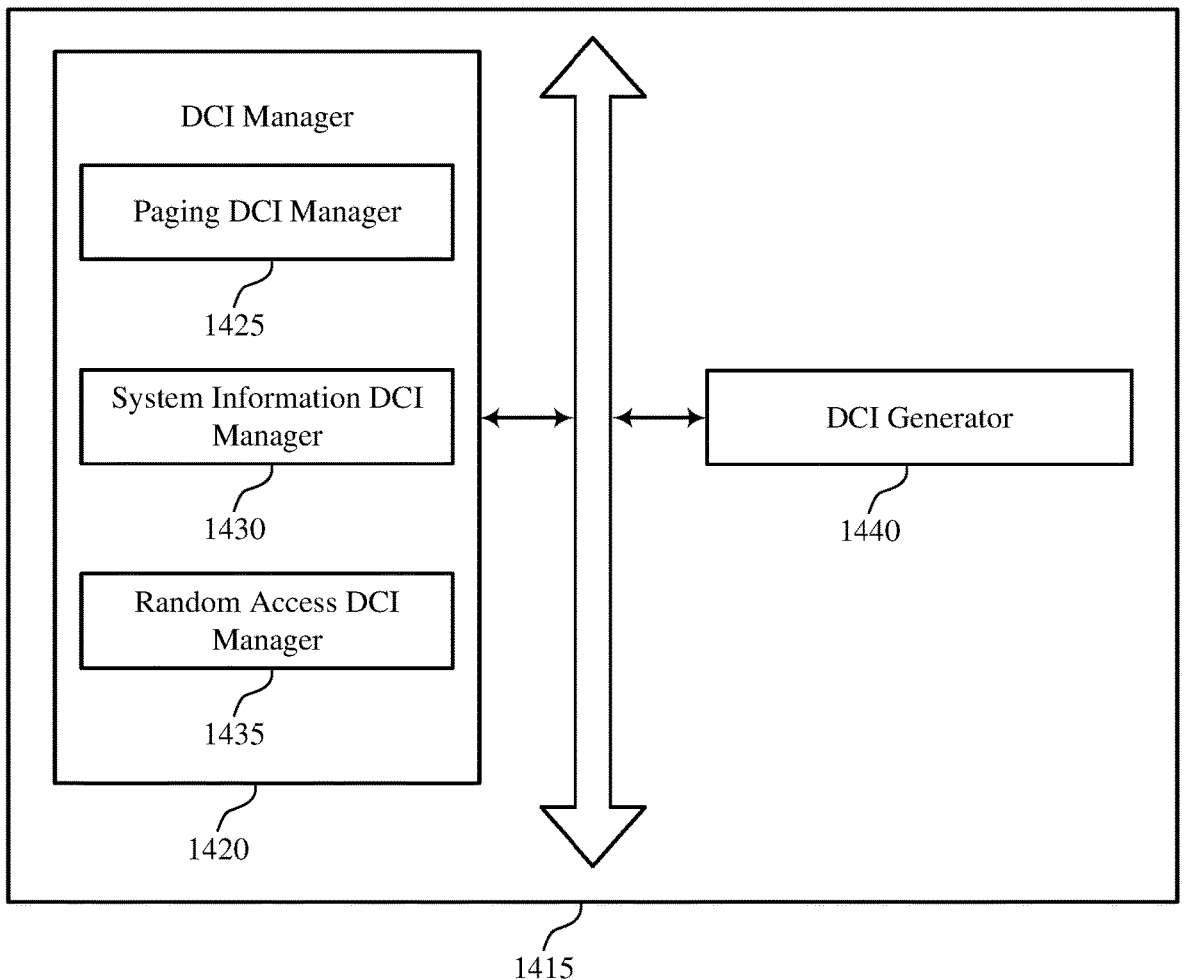

FIG. 14 shows a block diagram 1400 of a base station communications manager 1415 that supports multipurpose DCI bit fields in accordance with aspects of the present disclosure. The base station communications manager 1415 may be an example of aspects of a base station communications manager 1515 described with reference to FIGS. 12, 13, and 15. The base station communications manager 1415 may include DCI manager 1420 and DCI generator 1440. DCI manager 1420 may include paging DCI manager 1425, system information DCI manager 1430, and random access DCI manager 1435. Each of these modules may communicate, directly or indirectly, with one another (e.g., via one or more buses).

DCI manager 1420 may identify a first type of control information to transmit to a UE in a DCI message. DCI generator 1440 may then generate the DCI message for transmitting the first type of control information and utilize at least one bit field in the DCI message to provide an indication corresponding to the first type of control information, where the indication provided by the at least one bit field is different from an indication provided by a respective bit field in another DCI message for a second type of control information.

In some cases, the first type of control information includes a grant, and utilizing the at least one bit field in the DCI message to provide an indication corresponding to the first type of control information includes utilizing the at least one bit field in the DCI message as a DCI format identifier, a TPC command for scheduled PUCCH, a PUCCH resource indicator, a PDSCH-to-HARQ feedback timing indicator, a new data indicator, a redundancy version indicator, or a HARQ process number. In such cases, CRC bits of the DCI message may be scrambled using a C-RNTI.

In some cases, the first type of control information includes paging information, and paging DCI manager 1425 may utilize the at least one bit field in the DCI message as a short message indicator. In such cases, CRC bits of the DCI message may be scrambled using a P-RNTI. In some cases, the short message indicator indicates whether the DCI message comprises a short paging message. In some cases, the DCI message may also contain paging scheduling information. In some cases, the first type of control information includes system information, and system information DCI manager 1430 may utilize the at least one bit field in the DCI message as a system information format indicator or a short system information indicator. In such cases, CRC bits of the DCI message may be scrambled using a SI-RNTI.

In some cases, the first type of control information includes random access information, and random access DCI manager 1435 may utilize the at least one bit field in the DCI message to indicate a configuration for a Msg3 transmission. In such cases, CRC bits of the DCI message may be scrambled using a RA-RNTI. In some cases, the configuration for the Msg3 transmission indicates whether the UE should transmit a beam index in the Msg3 transmission. In some cases, the beam index corresponds to a synchronization signal block index or a CSI-RS index.

Figure 15:
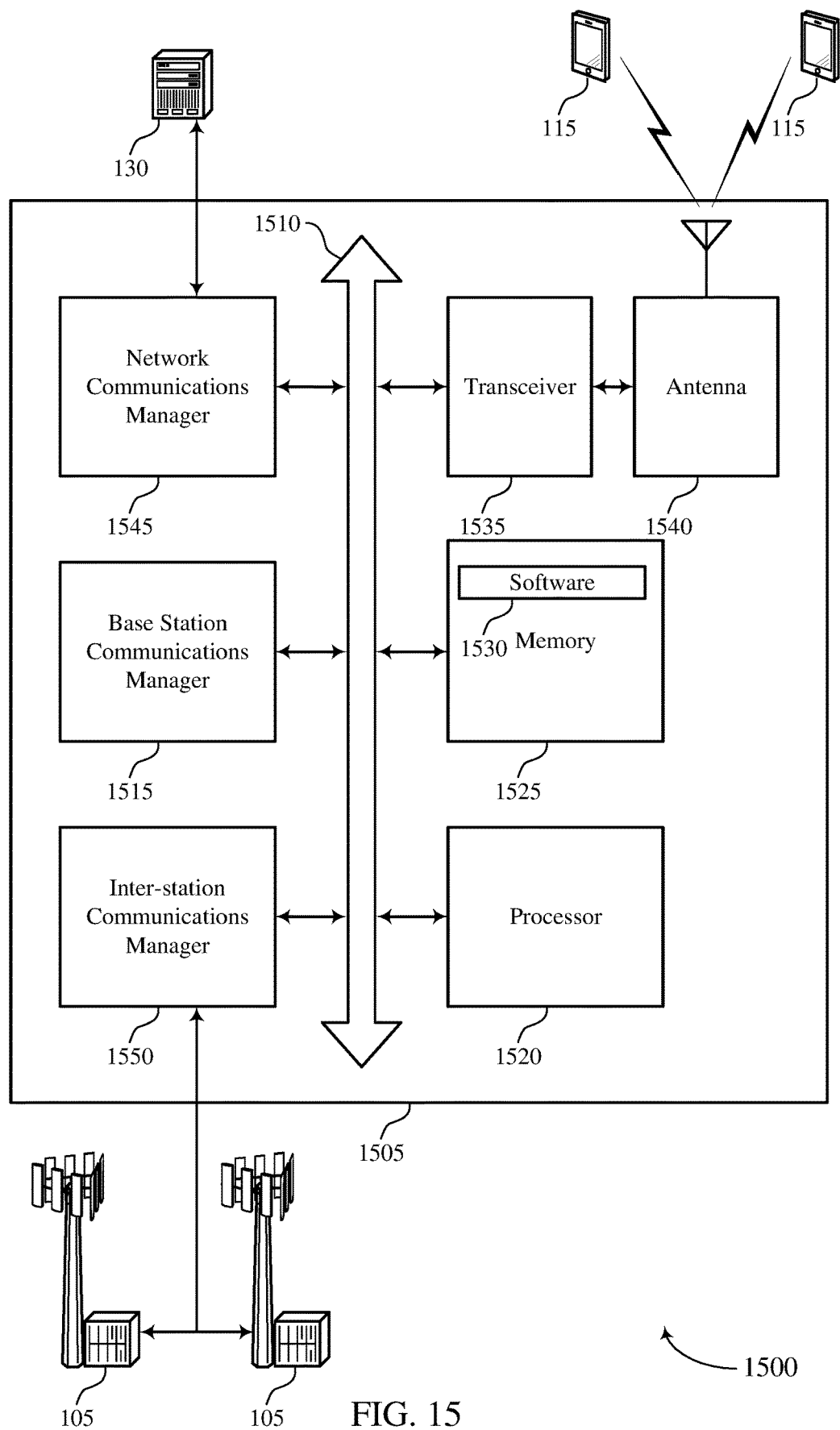
FIG. 15 illustrates a block diagram of a system including a base station that supports multipurpose DCI bit fields in accordance with aspects of the present disclosure.

FIG. 15 shows a diagram of a system 1500 including a device 1505 that supports multipurpose DCI bit fields in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting multipurpose DCI bit fields).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support multipurpose DCI bit fields. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
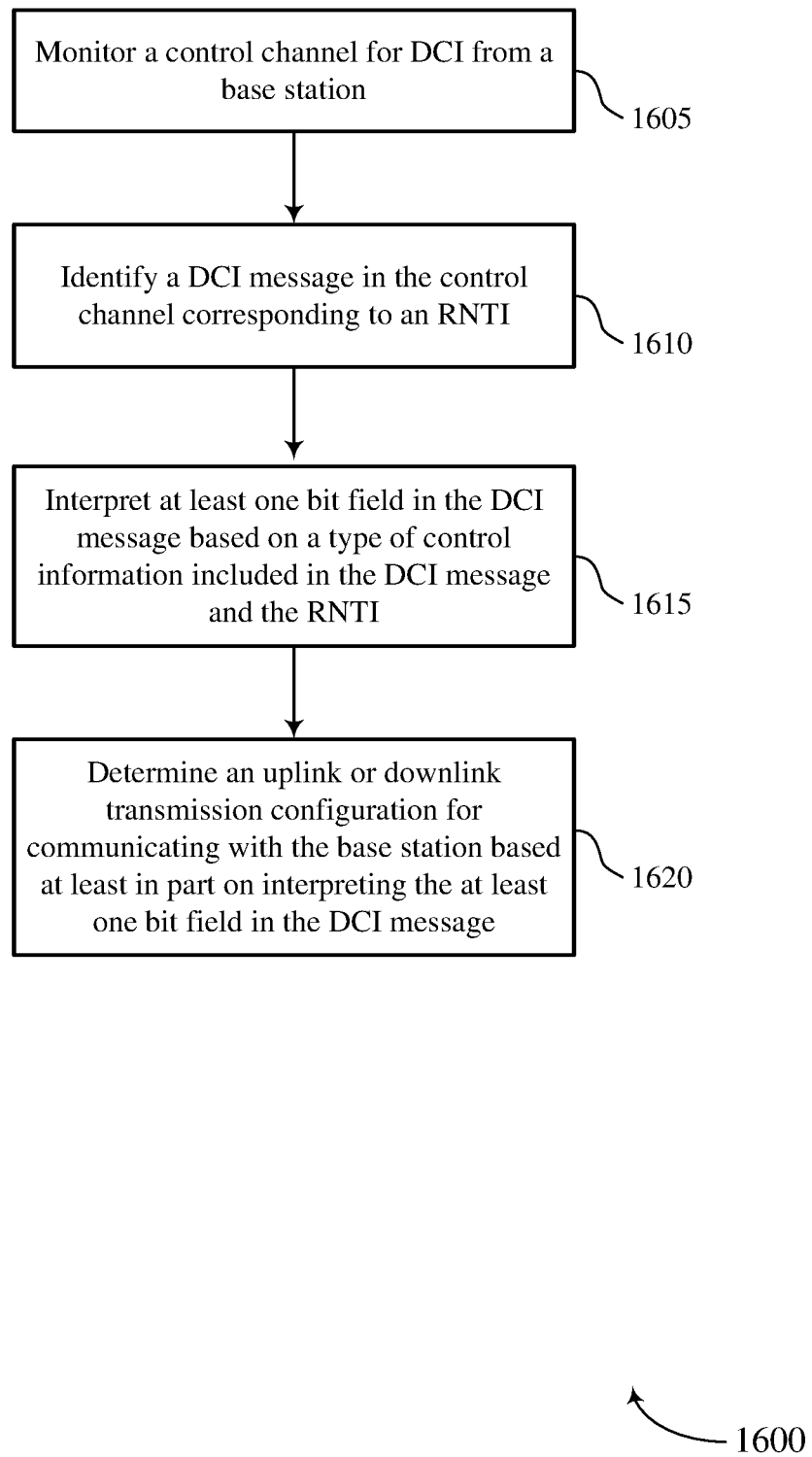
FIGS. 16-17 illustrate methods for supporting multipurpose DCI bit fields in accordance with aspects of the present disclosure.

FIG. 16 shows a flowchart illustrating a method 1600 for multipurpose DCI bit fields in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may monitor a control channel for DCI from a base station. The operations of 1605 may be performed according to the methods described herein. In certain examples, aspects of the operations of 1605 may be performed by a control channel manager as described with reference to FIGS. 8 through 11.

At 1610, the UE 115 may identify a DCI message in the control channel corresponding to an RNTI. The operations of 1610 may be performed according to the methods described herein. In certain examples, aspects of the operations of 1610 may be performed by a DCI manager as described with reference to FIGS. 8 through 11.

At 1615, the UE 115 may interpret at least one bit field in the DCI message based at least in part on the type of control information included in the DCI message and the RNTI. For instance, the UE 115 may interpret at least one bit field in the DCI message as a short message indicator, if the type of control information includes paging information. In some other cases, the UE 115 may interpret at least one bit field in the DCI message as a system information format indicator or a short system information indicator, or as a configuration for a Msg 3 transmission. In some cases, the configuration for the Msg3 transmission may indicate whether to include a beam index in the Msg3 transmission, where the beam index corresponds to a synchronization signal block index or a CSI-RS index. The operations of 1615 may be performed according to the methods described herein. In certain examples, aspects of the operations of 1615 may be performed by a DCI manager as described with reference to FIGS. 8 through 11.

At 1620, the UE 115 may determine an uplink or downlink transmission configuration for communicating with the base station based at least in part on interpreting the at least one bit field in the DCI message. The operations of 1625 may be performed according to the methods described herein. In certain examples, aspects of the operations of 1625 may be performed by a processor as described with reference to FIGS. 8 through 11.

Figure 17:
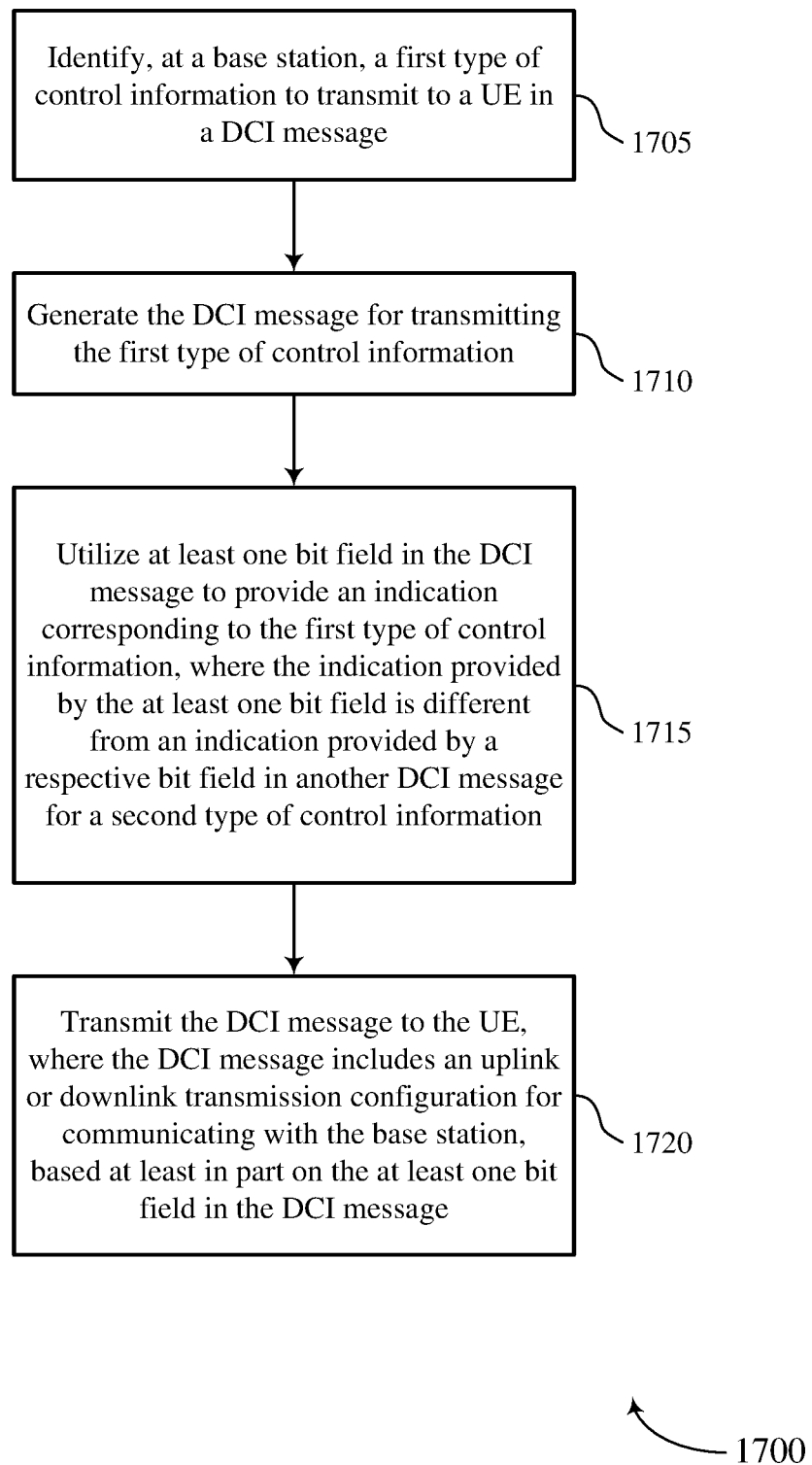

FIG. 17 shows a flowchart illustrating a method 1700 for multipurpose DCI bit fields in accordance with aspects of the present disclosure. The operations of method 1700 may be implemented by a base station 105 or its components as described herein. For example, the operations of method 1700 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1705, the base station 105 may identify a first type of control information to transmit to a UE in a DCI message, where the first type of control information may comprise at least one of paging information, system information, random access information, and a grant. The operations of 1705 may be performed according to the methods described herein. In certain examples, aspects of the operations of 1705 may be performed by a DCI manager as described with reference to FIGS. 12 through 15.

At 1710, the base station 105 may generate the DCI message for transmitting the first type of control information. The operations of 1710 may be performed according to the methods described herein. In certain examples, aspects of the operations of 1710 may be performed by a DCI generator as described with reference to FIGS. 12 through 15.

At 1715, the base station 105 may utilize at least one bit field in the DCI message to provide an indication corresponding to the first type of control information, wherein the indication provided by the at least one bit field is different from an indication provided by a respective bit field in another DCI message for a second type of control information. In some examples, the base station 105 may utilize the at least one bit field in the DCI message as a short message indicator, a system information format indicator or a short system information indicator, or to indicate a configuration for a Msg3 transmission. In some cases, the configuration of the Msg3 transmission may indicate whether the UE should transmit a beam index in the Msg3 transmission, where the beam index corresponds to a synchronization signal block index or a CSI-RS index. In some other cases, utilizing the at least one bit field in the DCI message may comprise utilizing the at least one bit field in the DCI message as a DCI format identifier, a TPC command for scheduled PUCCH, a PUCCH resource indicator, a PDSCH-to-HARQ feedback timing indicator, a new data indicator, a redundancy version indicator, or a HARQ process number. The operations of 1715 may be performed according to the methods described herein. In certain examples, aspects of the operations of 1715 may be performed by a DCI generator as described with reference to FIGS. 12 through 15.

At 1720, the base station 105 may transmit the DCI message to the UE, where the DCI message includes an uplink or downlink transmission configuration for communicating with the base station, based at least in part on the at least one bit field in the DCI message. The operations of 1720 may be performed according to the methods described herein. In certain examples, aspects of the operations of 1720 may be performed by a transmitter as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA.

UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring a control channel for downlink control information (DCI) from a base station;
receiving a DCI message having a DCI format in the control channel, wherein cyclic redundancy check (CRC) bits are attached to the DCI message and wherein the CRC bits are scrambled based on a radio network temporary identifier (RNTI);
interpreting at least one bit field in the DCI message based at least in part on the RNTI, wherein interpreting the at least one bit field of the DCI message of the DCI format comprise interpreting the at least one bit field in the DCI message as a first indication when the RNTI comprises a first RNTI and interpreting the at least one bit field in the DCI message as a second indication when the RNTI comprises a second RNTI that is different from the first RNTI, wherein the first RNTI comprises a channel dependent RNTI and the second RNTI comprise a user equipment (UE) dependent RNTI; and communicating with the base station based at least in part on interpreting the at least one bit field in the DCI message.

2. The method of claim 1, further comprising:

determining the type of control information included in the DCI message based at least in part on the RNTI, wherein interpreting the at least one bit field in the DCI message comprises interpreting based on the determining the type of control information.

3. The method of claim 2, wherein the type of control information included in the DCI message comprises paging scheduling information when the RNTI comprises a paging RNTI (P-RNTI).

4. The method of claim 1, wherein the RNTI comprises the channel dependent RNTI, wherein the channel dependent RNTI comprises a paging RNTI (P-RNTI) and the first indication comprises a short message indicator, wherein the short message indicator indicates whether the DCI message comprises a short paging message.

5. The method of claim 1, wherein the RNTI comprises the channel dependent RNTI, wherein the channel dependent RNTI comprises a system information RNTI (SI-RNTI) and the first indication comprises a system information format indicator or a short system information indicator.

6. The method of claim 1, wherein the RNTI comprises the channel dependent RNTI, wherein the channel dependent RNTI comprises a random access RNTI (RA-RNTI) and the second indication comprises a configuration for a Message 3 (Msg3) transmission.

7. The method of claim 6, wherein the configuration for the Msg3 transmission indicates whether to include a beam index in the Msg3 transmission, wherein the beam index corresponds to a synchronization signal block index or a channel state information reference signal (CSI-RS) index.

8. The method of claim 1, wherein the RNTI comprises the UE dependent RNTI, wherein the second RNTI comprises a cell RNTI (C-RNTI) and the second indication comprises a configuration for at least one of an uplink or downlink transmission, a transmit power control (TPC) command for scheduled physical uplink control channel (PUCCH), a PUCCH resource indicator, a physical downlink shared channel (PDSCH) to hybrid automatic repeat request (HARQ) feedback timing indicator, a new data indicator, a redundancy version indicator, or a HARQ process number.

9. The method of claim 1, wherein the RNTI comprises the UE dependent RNTI, wherein the second RNTI comprises a cell RNTI (C-RNTI) and the second indication comprises a DCI format identifier.

10. The method of claim 9, wherein the channel dependent RNTI comprises one of:

a paging RNTI (P-RNTI) and the first indication comprises a short message indicator, the short message indicator indicates whether the DCI message comprises a short paging message;

a system information RNTI (SI-RNTI) and the first indication comprises a system information format indicator or a short system information indicator; or a random access RNTI (RA-RNTI) and the second indication comprises a configuration for a Message 3 (Msg3) transmission.

11. The method of claim 1, wherein the DCI message comprises a first DCI message and wherein the RNTI comprises the first RNTI, wherein interpreting at least one bit field comprises interpreting the at least one bit field as the first indication, the method further comprising:

identifying a second DCI message in the control channel corresponding to the second RNTI; and interpreting the at least one bit field in the second DCI message as the second indication.

12. A method for wireless communication, comprising:

identifying, at a base station, a first type of control information to transmit to a user equipment (UE) in a downlink control information (DCI) message having a DCI format;

generating the DCI message for transmitting the first type of control information;

utilizing at least one bit field in the DCI message to provide an indication corresponding to the first type of control information, wherein the indication provided by the at least one bit field is different from an indication provided by a respective bit field in another DCI message having the DCI format for a second type of control information; and transmitting the DCI message to the UE and scrambling cyclic redundancy check (CRC) bits attached to the DCI message using a radio network temporary identifier (RNTI) corresponding to the first type of control information, wherein the indication of the at least one bit field comprises a first indication and the RNTI comprises a first RNTI when the first type of control information is identified and the indication comprises a second indication and the RNTI comprises a second RNTI when the second type of control information is identified, and wherein the first RNTI comprises a channel dependent RNTI and the second RNTI comprise a UE dependent RNTI.

13. The method of claim 12, wherein the RNTI comprises the UE dependent RNTI, wherein the second RNTI comprises a cell RNTI (C-RNTI) and the second indication comprises a DCI format identifier.

14. The method of claim 13, wherein the channel dependent RNTI comprises one of:

a paging RNTI (P-RNTI) and the first indication comprises a short message indicator, the short message indicator indicates whether the DCI message comprises a short paging message;

a system information RNTI (SI-RNTI) and the first indication comprises a system information format indicator or a short system information indicator; or a random access RNTI (RA-RNTI) and the second indication comprises a configuration for a Message 3 (Msg3) transmission.

15. An apparatus for wireless communication, comprising:

a processor, memory in electronic communication with the processor; and instructions stored in the memory and executable by the processor to cause the apparatus to:

monitor a control channel for downlink control information (DCI) from a base station;

receive a DCI message having a DCI format in the control channel, wherein cyclic redundancy check (CRC) bits are attached to the DCI message and wherein the CRC bits are scrambled based on a radio network temporary identifier (RNTI);

interpret at least one bit field in the DCI message based at least in part on the RNTI, wherein interpreting the at least one bit field of the DCI message of the DCI format comprise interpreting the at least one bit field in the DCI message as a first indication when the RNTI comprises a first RNTI and interpreting the at least one bit field in the DCI message as a second indication when the RNTI comprises a second RNTI that is different from the first RNTI, wherein the first RNTI comprises a channel dependent RNTI and the second RNTI comprise a UE dependent RNTI; and communicate with the base station based at least in part on interpreting the at least one bit field in the DCI message.

16. The apparatus of claim 15, wherein the instructions are further executable by the processor to cause the apparatus to:

determine the type of control information included in the DCI message based at least in part on the RNTI, wherein interpreting the at least one bit field in the DCI message comprises interpreting based on the determining the type of control information.

17. The apparatus of claim 16, wherein the type of control information included in the DCI message comprises paging scheduling information when the RNTI comprises a paging RNTI (P-RNTI).

18. The apparatus of claim 15, wherein the RNTI comprises the channel dependent RNTI, wherein the channel dependent RNTI comprises a paging RNTI (P-RNTI) and the first indication comprises a short message indicator, the short message indicator indicates whether the DCI message comprises a short paging message.

19. The apparatus of claim 15, wherein the RNTI comprises the channel dependent RNTI, wherein the channel dependent RNTI comprises a system information RNTI (SI-RNTI) and the first indication comprises a system information format indicator or a short system information indicator.

20. The apparatus of claim 15, wherein the RNTI comprises the channel dependent RNTI, wherein the channel dependent RNTI comprises a random access RNTI (RA-RNTI) and the second indication comprises a configuration for a Message 3 (Msg3) transmission.

21. The apparatus of claim 20, wherein the configuration for the Msg3 transmission indicates whether to include a beam index in the Msg3 transmission, wherein the beam index corresponds to a synchronization signal block index or a channel state information reference signal (CSI-RS) index.

22. The apparatus of claim 15, wherein the RNTI comprises the UE dependent RNTI, wherein the second RNTI comprises a cell RNTI (C-RNTI) and the second indication comprises a configuration for at least one of an uplink or downlink transmission, a transmit power control (TPC) command for scheduled physical uplink control channel (PUCCH), a PUCCH resource indicator, a physical downlink shared channel (PDSCH) to hybrid automatic repeat request (HARQ) feedback timing indicator, a new data indicator, a redundancy version indicator, or a HARQ process number.

23. The apparatus of claim 15, wherein the RNTI comprises the UE dependent RNTI, wherein the second RNTI comprises a cell RNTI (C-RNTI) and the second indication comprises a DCI format identifier.

24. The apparatus of claim 23, wherein the channel dependent RNTI comprises one of:

a paging RNTI (P-RNTI) and the first indication comprises a short message indicator, the short message indicator indicates whether the DCI message comprises a short paging message;

a system information RNTI (SI-RNTI) and the first indication comprises a system information format indicator or a short system information indicator; or a random access RNTI (RA-RNTI) and the second indication comprises a configuration for a Message 3 (Msg3) transmission.

25. The apparatus of claim 15, wherein the DCI message comprises a first DCI message and wherein the RNTI comprises the first RNTI, wherein interpreting at least one bit field comprises interpreting the at least one bit field as the first indication, the method further comprising:

identifying a second DCI message in the control channel corresponding to the second RNTI; and interpreting the at least one bit field in the second DCI message as the second indication.

26. An apparatus for wireless communication, comprising:

a processor, memory in electronic communication with the processor; and instructions stored in the memory and executable by the processor to cause the apparatus to:

identify, at a base station, a first type of control information to transmit to a user equipment (UE) in a downlink control information (DCI) message having a DCI format;

generate the DCI message for transmitting the first type of control information;

utilize at least one bit field in the DCI message to provide an indication corresponding to the first type of control information, wherein the indication provided by the at least one bit field is different from an indication provided by a respective bit field in another DCI message having the DCI format for a second type of control information; and transmit the DCI message to the UE and scrambling cyclic redundancy check (CRC) bits attached to the DCI message using a radio network temporary identifier (RNTI) corresponding to the first type of control information, wherein the indication of the at least one bit field comprises a first indication and the RNTI comprises a first RNTI when the first type of control information is identified and the indication comprises a second indication and the RNTI comprises a second RNTI when the second type of control information is identified, and wherein the first RNTI comprises a channel dependent RNTI and the second RNTI comprise a UE dependent RNTI.

27. The apparatus of claim 26, wherein the second RNTI comprises a cell RNTI (C-RNTI) and the second indication comprises a DCI format identifier.

28. The apparatus of claim 27, wherein the channel dependent RNTI comprises one of:

a paging RNTI (P-RNTI) and the first indication comprises a short message indicator, the short message indicator indicates whether the DCI message comprises a short paging message;

a system information RNTI (SI-RNTI) and the first indication comprises a system information format indicator or a short system information indicator; or a random access RNTI (RA-RNTI) and the second indication comprises a configuration for a Message 3 (Msg3) transmission.

* * * * *